US011471768B2

(12) United States Patent
Chan et al.

(10) Patent No.: US 11,471,768 B2
(45) Date of Patent: Oct. 18, 2022

(54) USER INTERFACE DISPLAY METHOD AND APPARATUS, DEVICE AND COMPUTER-READABLE STORAGE MEDIUM

(71) Applicant: TENCENT TECHNOLOGY (SHENZHEN) COMPANY LIMITED, Guangdong (CN)

(72) Inventors: Ka Ho Chan, Shenzhen (CN); Yin Pu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/227,667

(22) Filed: Apr. 12, 2021

(65) Prior Publication Data

US 2021/0228986 A1 Jul. 29, 2021

Related U.S. Application Data

(63) Continuation of application No. PCT/CN2020/071976, filed on Jan. 14, 2020.

(30) Foreign Application Priority Data

Feb. 20, 2019 (CN) .......................... 201910125801.3

(51) Int. Cl.
*A63F 13/00* (2014.01)
*A63F 13/537* (2014.01)
(Continued)

(52) U.S. Cl.
CPC .......... *A63F 13/537* (2014.09); *H04L 67/131* (2022.05); *H04L 67/75* (2022.05)

(58) Field of Classification Search
CPC ........ A63F 13/533; A63F 13/79; A63F 13/56; A63F 13/52
See application file for complete search history.

(56) References Cited

U.S. PATENT DOCUMENTS

2007/0129126 A1* 6/2007 Van Luchene ........ A63F 13/792
463/1
2007/0129148 A1* 6/2007 Van Luchene ........ A63F 13/352
463/1
(Continued)

FOREIGN PATENT DOCUMENTS

CN        107398071 A      11/2017
CN        107913521 A       4/2018
(Continued)

OTHER PUBLICATIONS

Clash of Clans tutorial https://youtu.be/jYWJt9LPXfc (Year: 2020).*
(Continued)

*Primary Examiner* — David L Lewis
*Assistant Examiner* — Eric M Thomas
(74) *Attorney, Agent, or Firm* — Sughrue Mion, PLLC

(57) ABSTRACT

The disclosure discloses a user interface display method and apparatus, a device, and a storage medium. The method includes: displaying a user interface; receiving a display instruction from a server, the display instruction including data of a first-class object and data of a second-class object, the first-class object being a virtual object having obtained a larger quantity of virtual resources than a target virtual object, the second-class object being a virtual object having obtained a same or smaller quantity of virtual resources than the target virtual object; and displaying first visible information corresponding to the first-class object in the user
(Continued)

interface, or displaying first visible information and second visible information corresponding to the second-class object in the user interface.

20 Claims, 14 Drawing Sheets

(51) Int. Cl.
*H04L 67/75* (2022.01)
*H04L 67/131* (2022.01)

(56) References Cited

U.S. PATENT DOCUMENTS

| | | | |
|---|---|---|---|
| 2011/0230267 A1* | 9/2011 | Van Luchene | A63F 13/77 463/43 |
| 2018/0001189 A1 | 1/2018 | Tang et al. | |

FOREIGN PATENT DOCUMENTS

| | | |
|---|---|---|
| CN | 108057243 A | 5/2018 |
| CN | 108434742 A | 8/2018 |
| CN | 109876438 A | 6/2019 |
| JP | 2011-24638 A | 2/2011 |

OTHER PUBLICATIONS

Chinese Office Action issued in CN 201910125801.3 dated Feb. 23, 2021.
International Search Report for PCT/CN2020/071976 dated Apr. 13, 2020 (PCT/ISA/210).
Written Opinion for PCT/CN2020/071976 dated Apr. 13, 2020 (PCT/ISA/237).
Office Action dated May 16, 2022 in Japanese Application No. 2021-540363.
Jerry Chu, "What to see on the camera", 4Gamer.net, Dec. 17, 2016, https://www.4gamer.net/games/999/G999905/20161213113/ (6 pages total).
BTOOOM!, online [Game Review], ApplivGames, Mar. 2, 2017, https://games.app-liv.jp/archives/241047 (6 pages total).

* cited by examiner

USER INTERFACE DISPLAY METHOD AND APPARATUS, DEVICE AND COMPUTER-READABLE STORAGE MEDIUM

CROSS-REFERENCE TO RELATED APPLICATION(S)

This application is a bypass continuation application of International Application No. PCT/CN2020/071976, filed on Jan. 14, 2020, which claims priority to Chinese Patent Application No. 2019101258013, entitled "USER INTERFACE DISPLAY METHOD AND APPARATUS, DEVICE, AND STORAGE MEDIUM" filed with the National Intellectual Property Administration, PRC on Feb. 20, 2019, the disclosures of which are herein incorporated by reference in their entireties.

FIELD

The disclosure relates to the field of computer technologies, and in particular, to a user interface display method and apparatus, a device, and a computer-readable storage medium.

BACKGROUND

Terminals such as a smartphone and a tablet computer are provided with many application programs including a two-dimensional or a three-dimensional virtual environment, for example, a military simulation program, a first-person shooting (FPS) game, a third-person shooting (TPS) game, and a multiplayer online battle arena (MOBA) game.

In the foregoing application programs, a user may control, by using a terminal, a target virtual object to have a battle in the virtual environment, to contest for a virtual resource. In the related art, based on a field of view of the target virtual object, a position of each virtual object in a virtual environment, and objects with the field of view of the target virtual object, a server determines data that needs to be transmitted to the terminal, so that the terminal displays, in a user interface according to the data, other virtual objects that need to be displayed.

SUMMARY

According to various embodiments of the disclosure, a user interface display method and apparatus, a device, and a storage medium are provided.

According to an aspect of an example embodiment, a user interface display method is provided, performed by at least one processor of a terminal, the method including:

displaying a user interface of an application program running on the terminal, the user interface displaying an image of a virtual environment observed from a perspective corresponding to a target virtual object, the target virtual object being a virtual object in the virtual environment that is controlled by using the terminal;

receiving a display instruction from a server, the display instruction including data of a first-class object and data of a second-class object, the first-class object being a virtual object having obtained a larger quantity of virtual resources than the target virtual object, the second-class object being a virtual object having obtained an equal or smaller quantity of virtual resources than the target virtual object, the first-class object and the second-class object belonging to teams different from a team to which the target virtual object belongs in the application program; and displaying first visible information according to the data of the first-class object in the user interface, and displaying, based on the second-class object being within a field of view from the perspective, second visible information in the user interface according to the data of the second-class object, an amount of the first visible information being larger than that of the second visible information.

According to an aspect of an example embodiment, a user interface display method is provided, performed by at least one processor of a server, the method including:

obtaining quantities of virtual resources of n virtual objects in a virtual environment, n being a positive integer, and n≥3;

sorting the n virtual objects in descending order of the quantities of virtual resources, to obtain sequence numbers of the n virtual objects;

determining a first-class object and a second-class object of a target virtual object in the n virtual objects according to the sequence numbers of the n virtual objects, the first-class object being a virtual object whose sequence number is smaller than that of the target virtual object, the second-class object being a virtual object whose sequence number is the same as or greater than that of the target virtual object, and the first-class object and the second-class object belonging to teams different from a team to which the target virtual object belongs; and transmitting a display instruction to a terminal corresponding to the target virtual object, the display instruction being used for instructing the terminal to: display first visible information according to data of the first-class object, included in the display instruction, in a user interface, and display, based on the second-class object being within a field of view from a perspective of the target virtual object, second visible information in the user interface according to data of the second-class object, included in the display instruction.

According to an aspect of an example embodiment, a user interface display apparatus is provided, including:

at least one memory configured to store program code; and at least one processor configured to read the program code and operate as instructed by the program code, the program code including:

display code configured to cause at least one of the at least one processor to display a user interface of an application program running on a terminal, the user interface displaying an image of a virtual environment observed from a perspective corresponding to a target virtual object, the target virtual object being a virtual object in the virtual environment that is controlled by using the terminal;

receiving code configured to cause at least one of the at least one processor to receive a display instruction from a server, the display instruction including data of a first-class object and data of a second-class object, the first-class object being a virtual object having obtained a larger quantity of virtual resources than the target virtual object, the second-class object being a virtual object having obtained an equal or smaller quantity of virtual resources than the target virtual object, the first-class object and the second-class object belonging to teams different from a team to which the target virtual object belongs in the application program; and the display code being further configured to cause at least one of the at least one processor to: display first visible information according to the data of the first-class object in the user interface, and display, based on the second-class object being within a field of view from the perspective, second visible information in the user interface according to the data of the second-class object, an amount of the first visible information being larger than that of the second visible information.

According to an aspect of an example embodiment, a user interface display apparatus is provided, including:

at least one memory configured to store program code; and at least one processor configured to read the program code and operate as instructed by the program code, the program code including:

processing code configured to cause at least one of the at least one processor to: obtain quantities of virtual resources of n virtual objects in a virtual environment, n being a positive integer, and n≥3; and determine a first-class object and a second-class object of a target virtual object among the n virtual objects according to a quantity of virtual resources included in each virtual object, the first-class object being a virtual object of which a quantity of virtual resources is greater than that of the target virtual object, the second-class object being a virtual object of which a quantity of virtual resources is equal to or less than that of the target virtual object, and the first-class object and the second-class object belonging to teams different from a team to which the target virtual object belongs; and transmission code configured to cause at least one of the at least one processor to transmit a display instruction to a terminal corresponding to the target virtual object, the display instruction being used for instructing the terminal to: display first visible information according to data of the first-class object, included in the display instruction, in a user interface; and display, based on the second-class object being within a field of view from a perspective of the target virtual object, second visible information according to data of the second-class object, included in the display instruction, in the user interface.

A terminal is provided, including a processor and a memory, the memory storing at least one instruction, the at least one instruction being loaded and executed by the processor to implement the user interface display method described above.

A computer device is provided, including a processor and a memory, the memory storing at least one instruction, the at least one instruction being loaded and executed by the processor to implement the user interface display method described above.

A non-transitory computer-readable storage medium is provided, storing at least one instruction, the at least one instruction being loaded and executed by a processor to implement the user interface display method described above.

BRIEF DESCRIPTION OF THE DRAWINGS

To describe the technical solutions in embodiments of the disclosure more clearly, the following briefly describes the accompanying drawings required for describing the embodiments. The accompanying drawings in the following descriptions show only some embodiments of the disclosure, and a person of ordinary skill in the art may still derive other drawings from the accompanying drawings without creative efforts.

DETAILED DESCRIPTION

To make the objectives, technical solutions, and advantages of the disclosure clearer, implementations of the disclosure are further described below in detail with reference to the accompanying drawings.

First, several terms described in the embodiments of the disclosure are briefly introduced.

Virtual environment: a virtual environment displayed (or provided) by an application program when run on a terminal. The virtual environment may be a simulated environment of the real world, or may be a semi-simulated semi-fictional three-dimensional (3D) environment, or may be an entirely fictional 3D environment. The virtual environment may be any one of a two-dimensional virtual environment, a 2.5-dimensional virtual environment, and a three-dimensional virtual environment. Optionally, the virtual environment is further used for a battle between at least two target virtual objects.

Virtual object is a movable object in the virtual environment. The movable object may be at least one of a virtual character, a virtual animal, and a cartoon character. Optionally, in a case that the virtual environment is a 3D virtual environment, the target virtual object is a 3D model created based on a skeletal animation technology. Each target virtual object has a shape and size in the 3D virtual environment, and occupies some space in the 3D virtual environment.

Virtual resource: an object that is obtainable to a virtual object in the virtual environment, and is used as a winner evaluation condition. For example, the virtual resource may be a virtual coin, a virtual card, virtual jewelry, or a virtual flag. Optionally, after the virtual object obtains a virtual resource, an attribute of the virtual object may be enhanced; alternatively, health points (or energy points) or an endurance value of the virtual object may be supplemented.

Figure 1:
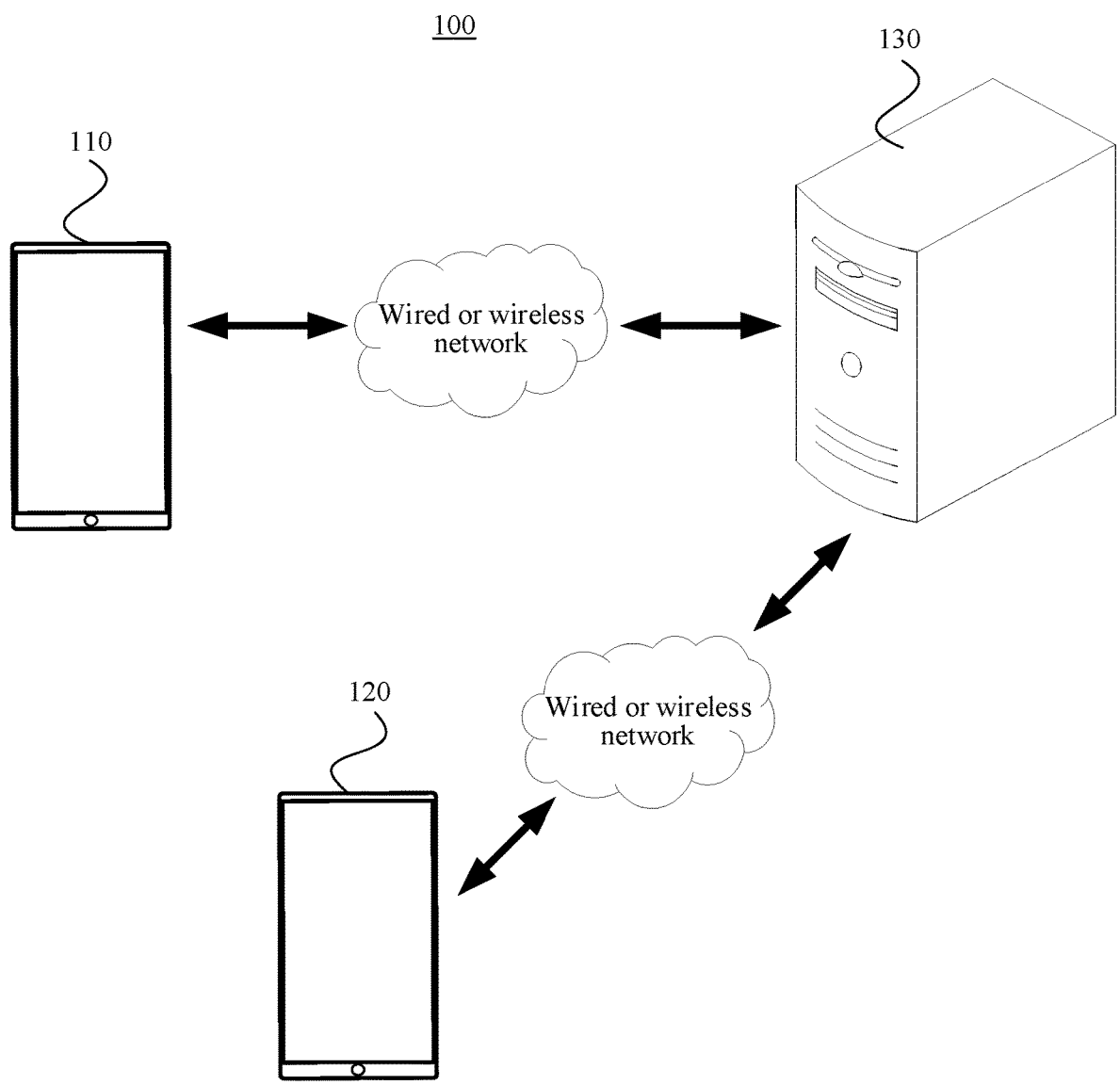
FIG. 1 is a structural block diagram of a computer system according to an exemplary embodiment of the disclosure.

FIG. 1 is a structural block diagram of a computer system according to an exemplary embodiment of the disclosure. A network access system 100 includes: a first terminal 110, a second terminal 120, and a server 130.

An application program supporting a virtual environment is installed and run on the first terminal 110. The application program may be any one of a military simulation application program, a third-person shooting (TPS) game, a first-person shooting (FPS) game, a multiplayer online battle arena (MOBA), a multiplayer shooting survival game. The first terminal 110 is a terminal used by a first user, the first user uses the first terminal 110 to control a target virtual object in the virtual environment to perform a movement, and the movement includes, but is not limited to, at least one of body posture adjustment, crawling, walking, running, cycling, jumping, driving, picking-up, shooting, attacking, and throwing. For example, the target virtual object is a first virtual character, such as a simulated character role or a cartoon character role.

The first terminal 110 and the second terminal 120 are connected to the server 130 by using a wireless network or a wired network.

The server 130 includes at least one of one server, a plurality of servers, a cloud computing platform, and a virtualization center. The server 130 is configured to provide a backend service for an application program supporting a virtual environment. Optionally, the server 130 takes on primary computing work, and the first terminal 110 and the second terminal 120 take on secondary computing work; alternatively, the server 130 takes on secondary computing work, and the first terminal 110 and the second terminal 120 take on primary computing work; alternatively, collaborative computing is performed by using a distributed computing architecture among the server 130, the first terminal 110, and the second terminal 120.

An application program supporting a virtual environment is installed and run on the second terminal 120. The application program may be any one of a military simulation application program, a TPS game, an FPS game, a MOBA, a multiplayer shooting survival game. The second terminal 120 is a terminal used by a second user, the second user uses the second terminal 120 to control a second virtual object in the virtual environment to perform a movement, and the movement includes, but is not limited to, at least one of body posture adjustment, crawling, walking, running, cycling, jumping, driving, picking-up, shooting, attacking, and throwing. For example, the second virtual object is a second virtual character, such as a simulated character role or a cartoon character role.

Optionally, the first virtual character and the second virtual character are located in the same virtual environment. Optionally, the first virtual character and the second virtual character may belong to the same team or the same organization, have a friend relationship, or have a temporary communication permission.

Optionally, the application programs installed on the first terminal 110 and the second terminal 120 are the same, or the application programs installed on the two terminals are the same type of application programs in different control system platforms. The first terminal 110 may generally refer to one of a plurality of terminals, and the second terminal 120 may generally refer to one of a plurality of terminals. In this embodiment, only the first terminal 110 and the second terminal 120 are used as an example for description. The first terminal 110 and the second terminal 120 are of the same or different device types. The device type includes at least one of a smartphone, a tablet computer, an e-book reader, an MP3 player, an MP4 player, a laptop, and a desktop computer. The following embodiment is described by using an example that the terminal includes a smartphone.

A person skilled in the art would understand that there may be more or fewer terminals. For example, there may be only one terminal, or there may be dozens of or hundreds of terminals or more. The quantity and the device type of the terminals are not limited in the embodiments of the disclosure.

Figure 2:
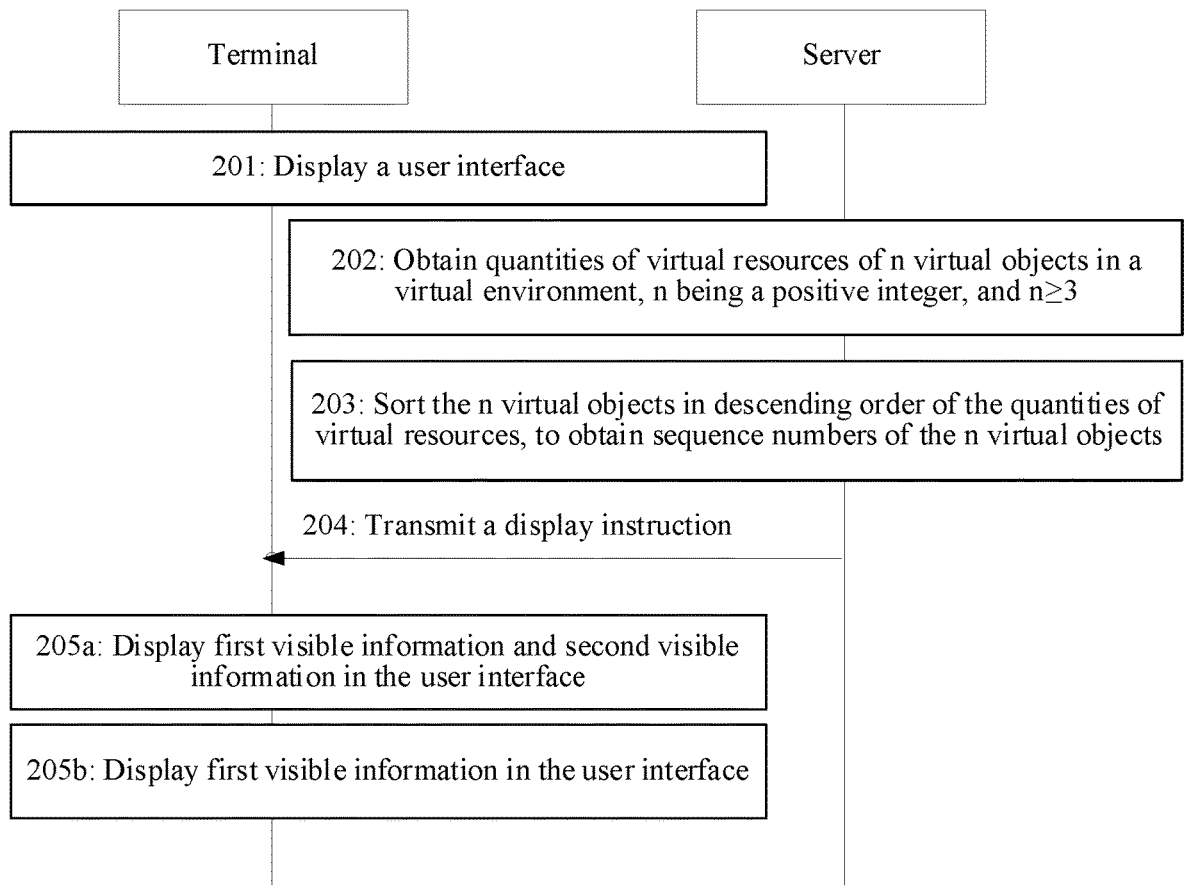
FIG. 2 is a flowchart of a user interface display method according to an exemplary embodiment of the disclosure.

FIG. 2 is a flowchart of a user interface display method according to an exemplary embodiment of the disclosure. As shown in FIG. 2, the method is applicable to the computer system shown in FIG. 1, and the method includes the following operations 201-205:

Operation 201: A terminal displays a user interface, the user interface displaying a picture (or an image) of a virtual environment observed from a perspective corresponding to a target virtual object.

The terminal is installed with an application program of a virtual environment, and when running the application program, the terminal displays a user interface, the user interface displaying a picture of a virtual environment observed from a perspective corresponding to a target virtual object. The target virtual object is a virtual object in the virtual environment that is controlled by a user by using the terminal.

Figure 3:
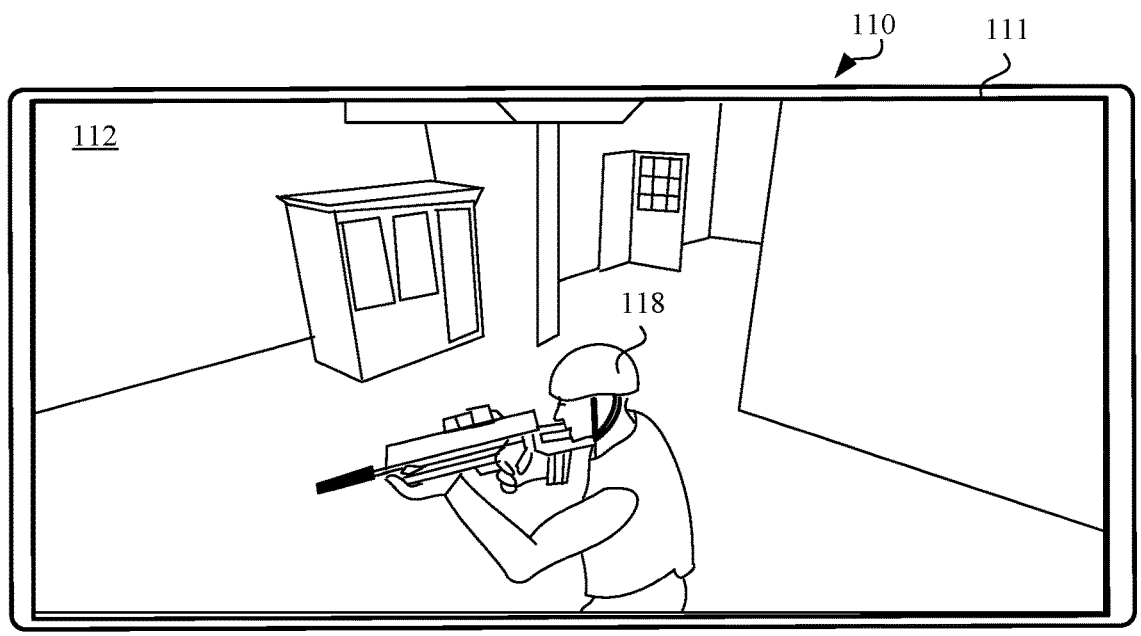
FIG. 3 is a schematic diagram of a user interface according to an exemplary embodiment of the disclosure.

For example, as shown in FIG. 3, a display screen 111 of the terminal 110 displays a user interface 112, and the user interface 112 displays a picture (or an image) of a virtual environment observed from a third-person perspective with respect to a target virtual object 118.

In this embodiment of the disclosure, the perspective corresponding to the target virtual object may be a first-person perspective (as if through one's own eyes), or may be a third-person perspective (having an outside perspective as if looking at a third party). The third-person perspective of the target virtual object is used as an example for description in FIG. 3, and the perspective is not limited. When the virtual environment is observed from the first-person perspective of the target virtual object, the user interface does not display the target virtual object.

Operation 202: A server obtains quantities of virtual resources of n virtual objects in a virtual environment, n being a positive integer, and n≥3.

A user database of the server stores data of a virtual object corresponding to each terminal (for example, identification information, reference coordinates, a state, and resources of each virtual object in the virtual environment). The server obtains quantities of virtual resources of n virtual objects in the virtual environment at intervals of a first preset period of time.

Operation 203: The server sorts the n virtual objects in descending order of the quantities of virtual resources, to obtain sequence numbers of the n virtual objects.

For example, there are four virtual objects moving in the virtual environment, which are respectively a virtual object 1, a virtual object 2, a virtual object 3, and a target virtual object. Quantities of virtual resources of the four virtual objects are respectively that: a quantity of virtual resources of the virtual object 1 is 20, a quantity of virtual resources of the virtual object 2 is 29, a quantity of virtual resources of the virtual object 3 is 15, and a quantity of virtual resources of the target virtual object is 21. Then the virtual object 1, the virtual object 2, the virtual object 3, and the target virtual object are sorted in descending order of the quantities of virtual resources, to obtain a sequence number (or sorting order) 3 of the virtual object 1, a sequence number 1 of the virtual object 2, a sequence number 4 of the virtual object 3, and a sequence number 3 of the target virtual object.

Optionally, before performing operation 203, and after randomly generating a start position and a start speed of each virtual resource, the server transmits a first generation instruction to the terminal, the first generation instruction including the start position and the start speed; calculates a motion trajectory of the each virtual resource according to the start position and the start speed; and calculates a final position of the each virtual resource according to the start position and the motion trajectory.

After being generated at a start position, each virtual resource moves from the start position for a period of time and then becomes static at a final position. The server randomly generates a start position and a start speed of each virtual resource, calculates a motion trajectory of the each virtual resource according to a preset algorithm based on the start position and the start speed, and calculates a final position of the each virtual resource according to the start position and the motion trajectory. For example, a motion manner of a virtual resource is linear motion, then a linear motion trajectory within a preset motion time is calculated according to a start position and a start speed; and a final position of the virtual resource is calculated according to the linear motion trajectory and the start position. If a motion manner of a virtual resource is curve motion, a motion trajectory of the curve motion is segmented into a plurality of pieces (e.g., n number of pieces) of linear motion, each piece of linear motion being corresponding to a unit motion time; a first position and a first speed of the virtual resource after a first unit time are calculated according to a start position and a start speed; a second position and a second speed of the virtual resource after a second unit time are calculated according to the first position and the first speed; and a final position is then calculated (e.g., a final position of the virtual resource after a (n−1)-th unit time is calculated according to a (n−2)-th position and a (n−2)-th speed of the virtual resource).

Operation 204: The server transmits a display instruction to the terminal, the display instruction including data of a first-class object and data of a second-class object, an amount of the data of the first-class object is larger than that of the data of the second-class object.

The first-class object is a virtual object whose sequence number in the sorting of the virtual objects is smaller (that is, higher sorting order) than that of the target virtual object, and the second-class object is a virtual object whose sequence number is the same as or greater (that is, the same or lower sorting order) than that of the target virtual object. The first-class object and the second-class object belong to camps (or teams) different from a camp (or a team) to which the target virtual object belongs, in a team play of a game.

For example, the virtual object 1 and the virtual object 2 belong to a first camp, and the virtual object 3 and the target virtual object belong to a second camp. The server determines that the virtual object 1 whose sequence number is smaller than that of the target virtual object and belonging to a camp different from a camp to which the target virtual object belongs as a first-class object, and obtains data of the virtual object 1; and determines that the virtual object 3 whose sequence number is greater than that of the target virtual object and belonging to a camp different from the camp to which the target virtual object belongs as a second-class object. After obtaining data of the virtual object 3, the server transmits a display instruction to the terminal, the display instruction including the data of the virtual object 1 and the data of the virtual object 3.

The first-class object may be within or not within a field of view from the perspective of the target virtual object. In a case that the second-class object is within a field of view from the perspective, and no opaque first object (e.g., obstacle) exists in front of the second-class object in a direction of the perspective, operation 205a is performed; and in a case that the second-class object is not within the field of view from the perspective, and/or an opaque first object exists in front of the second-class object in the direction of the perspective, operation 205b is performed.

Operation 205a: The terminal displays first visible information and second visible information in the user interface.

The first visible information is generated by the terminal according to the data of the first-class object, and the second visible information is generated by the terminal according to the data of the second-class object. An amount of the first visible information is larger than that of the second visible information.

For example, the first visible information includes body model information and/or first state information of the first-class object, and the data of the first-class object includes identification information, first reference coordinates, and state data of the first-class object. The terminal obtains a body model of the first-class object corresponding to the identification information from a database of an application program according to the identification information of the first-class object, determines a position of the first-class object in the virtual environment according to the first reference coordinates, and generates the body model information and the first state information of the first-class object at the position.

The first state information includes at least one of health points or an endurance value of the first-class object (which is displayed as health points of the first-class object when the first-class object is a virtual character, and displayed as an endurance value of the first-class object when the first-class object is a virtual object such as a machine, a weapon, and a transportation means), a quantity of virtual resources of the first-class object, a defense value of the first-class object, and prop information of the first-class object.

For example, the second visible information includes body model information of the second-class object.

Operation 205b: The terminal displays the first visible information in the user interface.

The first visible information is generated by the terminal according to the data of the first-class object. When the second-class object is not within the field of view from the perspective, and/or an opaque first object exists in front of the second-class object in the direction of the perspective, the terminal displays the first visible information in the user interface.

For example, the first visible information includes body model information and/or first state information of the first-class object, and the data of the first-class object includes identification information and first reference coordinates of the first-class object, or identification information, first reference coordinates, and state data of the first-class object. The terminal obtains a body model of the first-class object corresponding to the identification information from the database of the application program according to the identification information of the first-class object, determines a position of the first-class object in the virtual environment according to the first reference coordinates, and generates the body model information and/or the first state information of the first-class object at the position.

Figure 4:
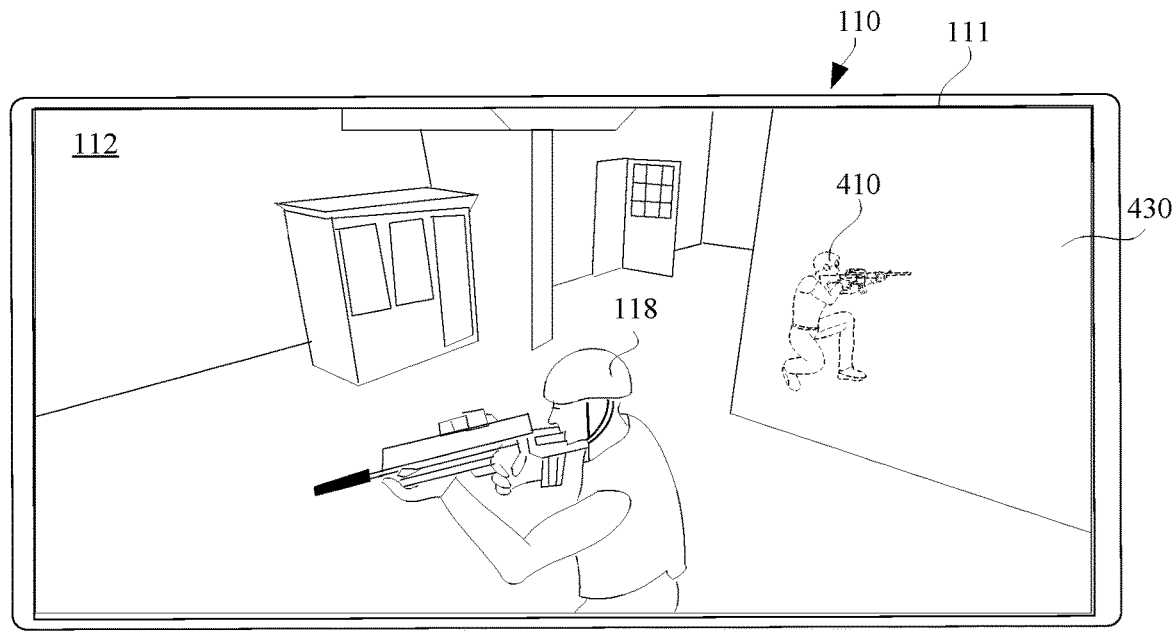
FIG. 4 is a schematic diagram of a user interface according to an exemplary embodiment of the disclosure.

For example, as shown in FIG. 4, a display screen 111 of the terminal 110 displays a user interface 112, and the user interface 112 displays a picture (or an image) of a virtual environment observed from a third-person perspective of a target virtual object 118. When a first-class object 410 and a second-class object (not shown) are within the field of view from the third-person perspective, and an opaque first object 430 (that is, a shelter, the wall in FIG. 4) exists in front of the first-class object 410 and the second-class object in the direction of the perspective, the terminal displays body model information of the first-class object 410 to be shown through the first object 430, and does not display body model information of the second-class object.

Optionally, the terminal displays the body model information of the first-class object, and/or first state information of the first-class object through the first object. The first state information includes at least one of health points or an endurance value of the first-class object (which is displayed as health points of the first-class object when the first-class object is a virtual character, and displayed as an endurance value of the first-class object when the first-class object is a virtual object such as a machine, a weapon, and a transportation means), a quantity of virtual resources of the first-class object, a defense value of the first-class object, and prop information of the first-class object. Optionally, the body model information of the first-class object includes a contour of the first-class object, or a contour of the first-class object and a posture of the first-class object.

Optionally, when displaying the body model information of the first-class object through the first object: the terminal generates, according to the data of the first-class object by using a silhouette effect, the body model information overlaid on the first object, the body model information being body model information of the first-class object in the virtual environment; and the terminal displays the first object and the body model information overlaid on the first object.

For example, the user interface of the terminal further displays a map of the virtual environment. The first visible information includes an identifier of the first-class object, and the data of the first-class object includes identification information and first reference coordinates of the first-class object. The terminal obtains an identifier corresponding to the identification information from the database of the application program according to the identification information of the first-class object, determines a first region corresponding to the first reference coordinates according to the first reference coordinates of the first-class object, and generates the identifier of the first-class object in the first region.

Figure 5:
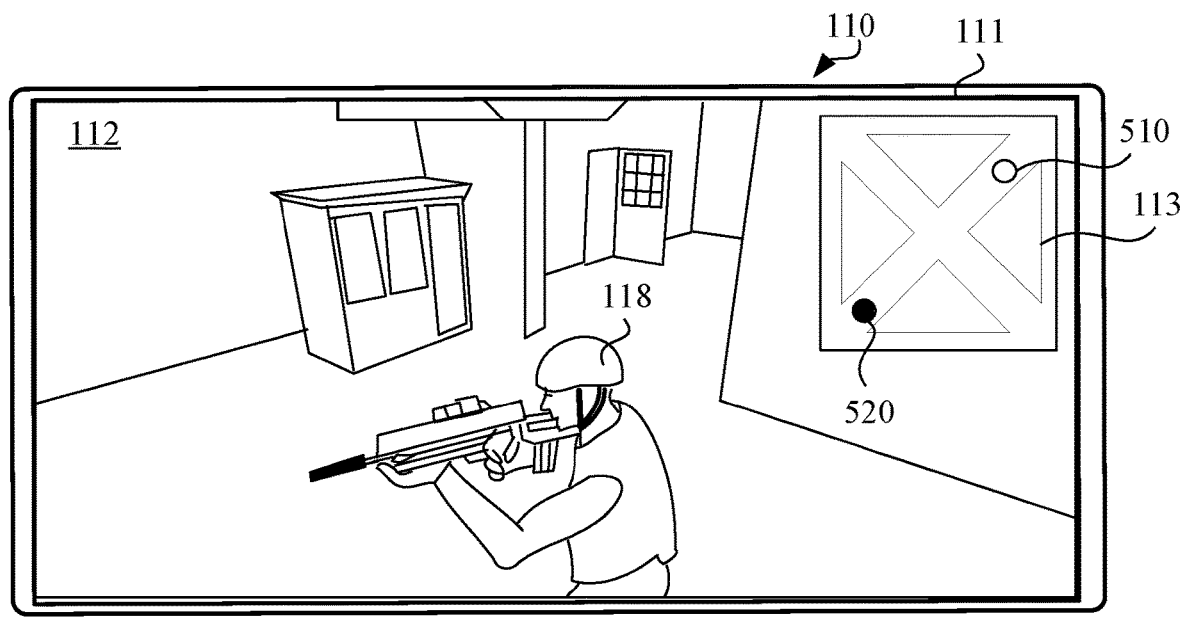
FIG. 5 is a schematic diagram of a user interface according to an exemplary embodiment of the disclosure.

For example, as shown in FIG. 5, a display screen 111 of the terminal 110 displays a user interface 112, and the user interface 112 displays a map 113 of a virtual environment and a picture (or an image) of a virtual environment observed from a third-person perspective of a target virtual object 118. When a first-class object and a second-class object are not within a field of view from the perspective, an identifier 510 of the first-class object and an identifier 520 of the target virtual object are displayed in a first region on the map 113.

For example, the first visible information includes a position and/or state information of the first-class object, and data of the first-class object includes first reference coordinates and/or state data of the first-class object. The terminal determines the position of the first-class object in the virtual environment according to the first reference coordinates of the first-class object and/or generates the state information of the first-class object according to the state data of the first-class object, and generates an information window in the user interface, the information window including the position and/or state information of the first-class object.

Figure 6:
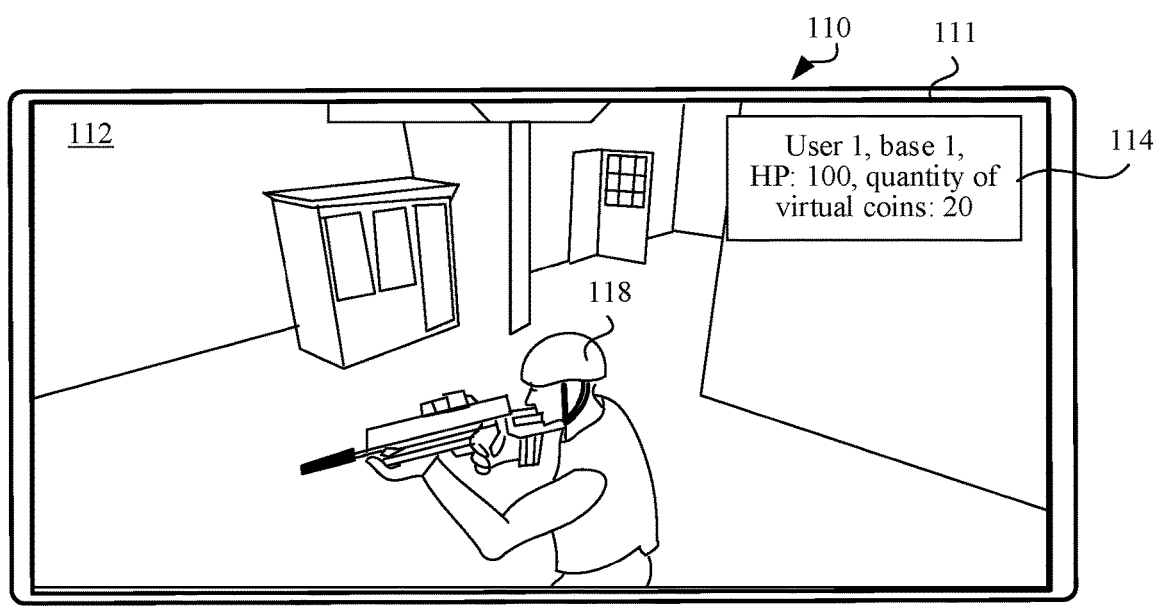
FIG. 6 is a schematic diagram of a user interface according to an exemplary embodiment of the disclosure.

For example, as shown in FIG. 6, a display screen 111 of the terminal 110 displays a user interface 112, and the user interface 112 displays an information window 114 and a picture (or an image) of a virtual environment observed from a third-person perspective of a target virtual object 118. A position of a first-class object ("user 1, base 2" in FIG. 6) and/or first state information of the first-class object ("HP: 100, a quantity of virtual coins: 20" in FIG. 6) are displayed in the information window 114.

Optionally, the first state information includes at least one of health points or an endurance value of the first-class object (which is displayed as health points of the first-class object when the first-class object is a virtual character, and displayed as an endurance value of the first-class object when the first-class object is a virtual object such as a machine, a weapon, and a transportation means), a quantity of virtual resources of the first-class object, a defense value of the first-class object, and prop information of the first-class object.

Optionally, before performing operation 205a or operation 205b, the terminal receives a first generation instruction transmitted by the server; calculates, according to a start position of each virtual resource and a start speed of the each virtual resource included in the first generation instruction, a motion trajectory of the each virtual resource; displays the motion trajectory of the each virtual resource in the user interface; calculates a final position of the each virtual resource according to the start position and the motion trajectory; and displays the each virtual resource at the final position.

After being generated at a start position, each virtual resource moves from a start position for a period of time and then becomes static at a final position. After receiving the first generation instruction, the terminal calculates a motion trajectory of each virtual resource according to a preset algorithm the same as an algorithm stored in the server based on a start position and a start speed, calculates a final position of the each virtual resource according to the start position and the motion trajectory, and displays the virtual resource at the final position. For example, a motion manner of a virtual resource is linear motion, then a linear motion trajectory within a preset motion time is calculated according to a start position and a start speed; and a final position of the virtual resource is calculated according to the linear motion trajectory and the start position. If a motion manner of a virtual resource is curve motion, a motion trajectory of the curve motion is segmented into a plurality of pieces of linear motion, each piece of linear motion being corresponding to a unit motion time; a first position and a first speed of the virtual resource after a first unit time are calculated according to a start position and a start speed; a second position and a second speed of the virtual resource after a second unit time are calculated according to the first position and the first speed; and a final position is then calculated.

Based on the above, in this embodiment of the disclosure, the server transmits data including the first-class object and the second-class object to the terminal, the first-class object being a virtual object having a larger quantity of virtual resources than the target virtual object, the second-class object being a virtual object having a same or smaller quantity of virtual resources than the target virtual object; the terminal generates and displays the first visible information according to the data of the first-class object in the user interface, or generates and displays the first visible information according to the data of the first-class object and the second visible information according to the data of the second-class object in the user interface. The server determines, only based on a quantity of virtual resources of each virtual object, data that needs to be transmitted. It is unnecessary for the server to determine the data that needs to be transmitted, based on a field of view of the target virtual object, a position of each virtual object, and objects within the field of view of the target virtual object. Therefore, a calculation amount is reduced, thereby reducing occupation of hardware resources of the server. In addition, an amount of the first visible information is larger than that of the second visible information, so that disadvantages of virtual objects having a small quantity of virtual resources in a battle may be balanced, thereby improving fairness and dynamic game play of the battle in the virtual environment.

Optionally, in this embodiment of the disclosure, the server transmits a first generation instruction including a start position and a start speed of a virtual resource to the terminal; and the server and the terminal separately calculate a motion trajectory of the virtual resource by using the same algorithm based on the start position and the start speed, and determine a final position of the virtual resource according to the start position and the motion trajectory, so that the server does not need to synchronize a motion trajectory of each virtual resource to the terminal, thereby reducing occupation of network resources.

An implementation of displaying the first-class object by the user interface through the first object in the embodiment shown in FIG. 2 is described by using an example in which an application program having a virtual environment is a game, and virtual objects are game roles controlled by users. However, this is merely an example and embodiments of the disclosure are not limited thereto.

Visibility between users in the game may be implemented in the following manner: (1) Whether the game roles controlled by the users are visible to each other is statically queried by using potentially visible set (PVS) data, the PVS data being configuration data simultaneously exported during construction of a game scene, and whether a game role controlled by a user is visible being determined by querying the static configuration during running of the game. (2) Visibility of a game role is determined by using code logic, that is, to implement dynamic visibility by controlling a synchronization rule of state data among different users.

Figure 7:
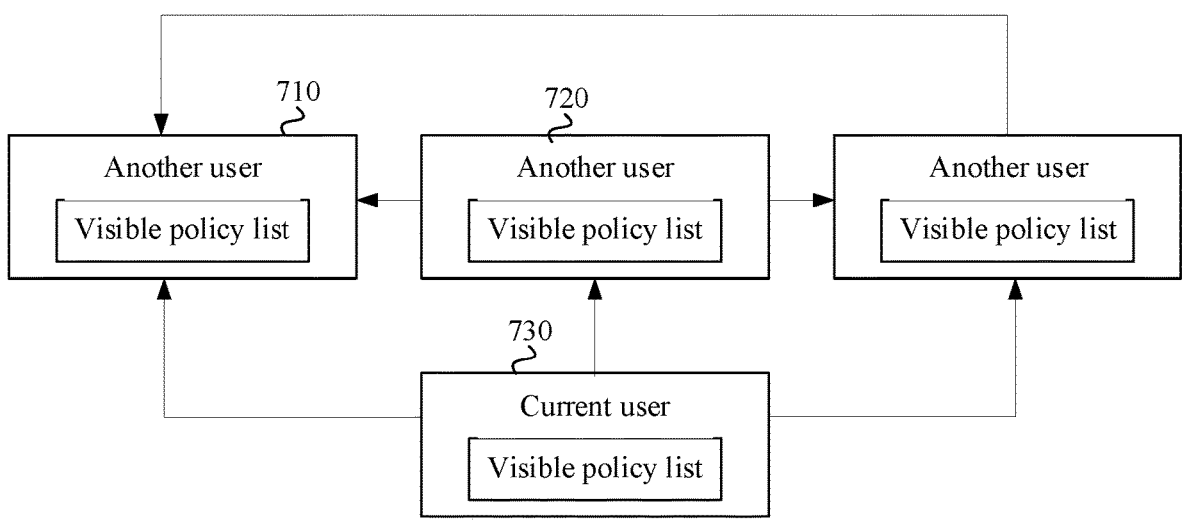
FIG. 7 is a schematic diagram of a state data synchronization manner according to an exemplary embodiment of the disclosure.

Because the entire game is based on a manner of state synchronization, the server is responsible for running the game world, and simultaneously synchronizing state data of objects and game roles in the game world to the terminal. As shown in FIG. 7, a current user (local player) 730 may observe virtual resources (for example, virtual coins) in front of a game role controlled by the current user and other roles, and a server may synchronize state data such as positions and orientations of each virtual resource and other roles to a terminal of the current user 730. Accordingly, the terminal is enabled to create an object in the game scene based on the synchronized state data.

As shown in FIG. 7, each user has a visible policy list, and the list is updated according to a ranking of game roles controlled by users. The list is analyzed when the server synchronizes data, and state synchronization is selectively performed for a visible policy between each two users of all of users in the game. For example, the current user 730 in FIG. 7 may see a game role controlled by another user (remote player) 710 and a game role controlled by another user 720, and the server synchronizes current state data of the another user 710 and the another user 720 such as positions and orientations to the current user 730. In this way, the game roles controlled by the another user 710 and the another user 720 may be seen from a terminal of the current user 730.

For example, the visible policy list is determined by the server in the following manner: obtaining quantities of virtual resources of n virtual objects in a virtual environment at a set time interval, and sorting the n virtual objects in descending order of the quantities of virtual resources, to obtain sequence numbers of the n virtual objects, n being a positive integer, and n≥3. Each virtual object corresponds to one visible policy list. By using the target virtual resource as an example, the server obtains a first-class object whose sequence number is smaller than that of the target virtual object and a second-class object whose sequence number is the same as or greater than that of the target virtual object, and uses a data list of the first-class object and a data list of the second-class object as a visible policy list of the target virtual object. For example, the data list of the first-class object includes identification information, a position, and a quantity of virtual resources of the first-class object, and the data list of the second-class object includes identification information of the second-class object.

Figure 8:
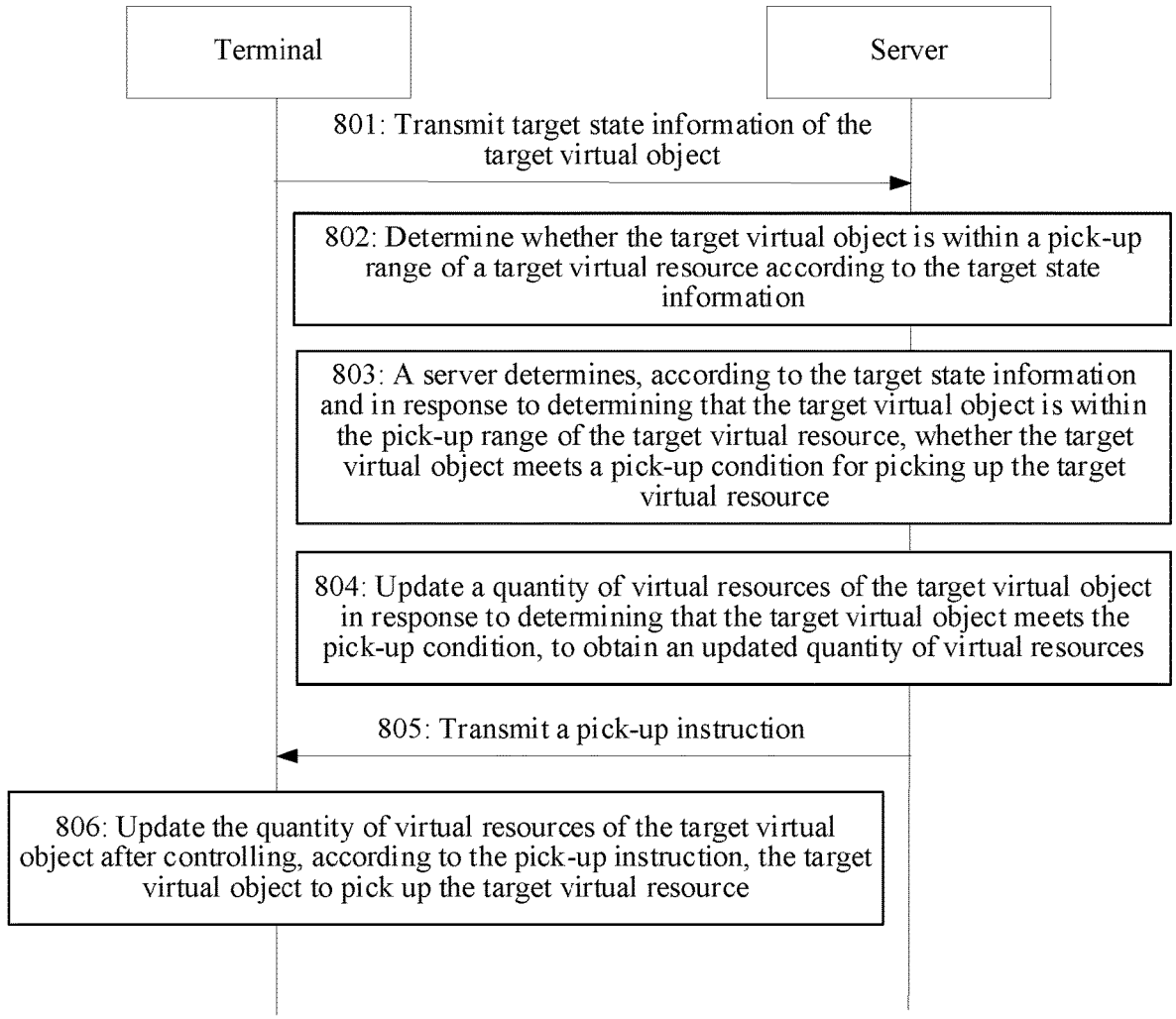
FIG. 8 is a flowchart of a method for picking up a virtual resource according to an exemplary embodiment of the disclosure.

FIG. 8 is a flowchart of a method for picking up a virtual resource according to an exemplary embodiment of the disclosure. The method is applicable to the computer system shown in FIG. 1. The method may be an operation performed before operation 202 in the embodiment in FIG. 2. The method includes the following operations 801-806:

Operation 801: The terminal transmits target state information of the target virtual object to the server.

The target state information is used for indicating a position of the target virtual object corresponding to the terminal in the virtual environment. Optionally, the terminal transmits target state information of the target virtual object to the server at intervals of a second preset period of time; or the terminal transmits target state information of the target virtual object to the server based on a triggering event. For example, the triggering event is that the target virtual object enters a pick-up range of a target virtual resource, which will be described below.

For example, the target state information includes identification information of the target virtual object and first reference coordinates of the target virtual object in the virtual environment.

Operation 802: The server determines whether the target virtual object is within a pick-up range of a target virtual resource according to the target state information.

The target virtual resource is a virtual resource in the virtual environment. The server uses a sphere determined with second reference coordinates of the target virtual resource as a center and a preset length as a radius as the pick-up range of the target virtual object, and determines whether the target virtual object is within the pick-up range by detecting whether the first reference coordinates are within the pick-up range.

For example, a virtual resource is a virtual coin, and a pick-up range of the virtual resource is a sphere collider component. When the sphere collider component collides with another object, the server receives an OnTriggerEnter (triggering for entering) event. In processing logic of the event, the server is activated to detect whether the object meets a pick-up condition.

Operation 803: A server determines, according to the target state information and in response to determining that the target virtual object is within the pick-up range of the target virtual resource, whether the target virtual object meets a pick-up condition for picking up the target virtual resource.

Optionally, a method for determining, by the server according to the target state information, whether the target virtual object meets the pick-up condition includes, but is not limited to, the following operations:

Operation 803a: The server determines, according to the identification information of the target virtual object, whether the target virtual object is alive.

The target state information includes the identification information of the target virtual object. The server queries, according to the identification information, a database for whether the target virtual object is alive. If the target virtual object is alive, operation 803b is performed; and if the target virtual object died, it is determined that the target virtual object does not meet the pick-up condition, and operations stop.

Operation 803b: The server determines, in response to determining that the target virtual object is alive, whether a second object exists between the target virtual object and the target virtual resource.

In this embodiment, if a second object (that is, an obstacle) exists between the target virtual object and the target virtual resource, the target virtual resource cannot be picked up. A method for determining, by the server, whether a second object exists between the target virtual object and the target virtual resource includes, but is not limited to: obtaining a connection line between the target virtual object and the target virtual resource according to first reference coordinates and second reference coordinates; determining whether a second object exists on the connection line; and determining, in a case that no second object exists on the connection line, that no second object exists between the target virtual object and the target virtual resource.

Figure 9:
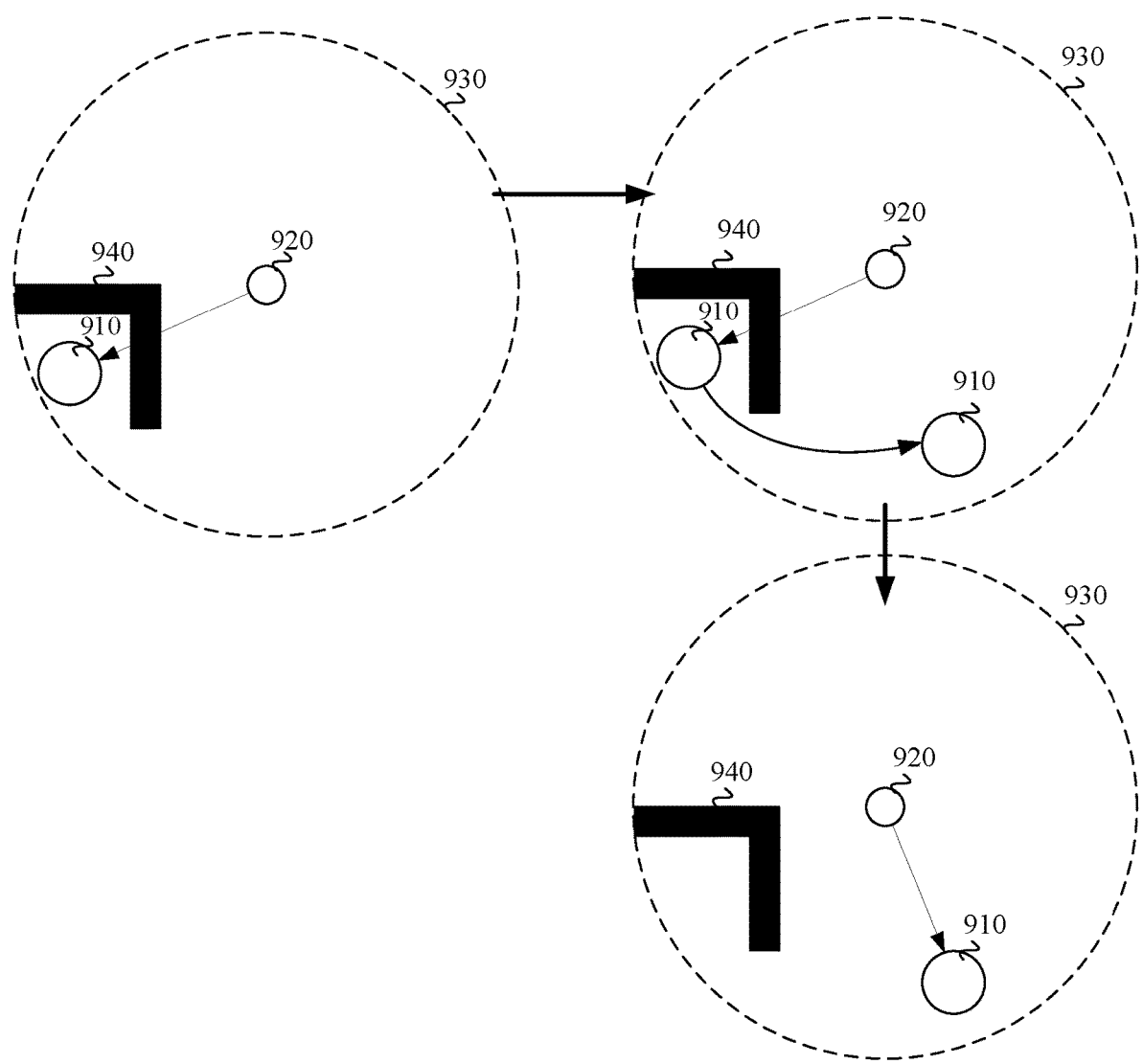
FIG. 9 is a schematic diagram of a ray detection method according to an exemplary embodiment of the disclosure.

A manner of detecting an obstacle by using the connection line between the first reference coordinates and the second reference coordinates may be referred to as ray detection. In an exemplary embodiment, an application program is a game, a virtual object is a game role, and a virtual resource is a virtual coin. The server senses, through ray detection of the virtual coin and the game role, whether an obstacle such as a wall body or a corner of a wall exists between the virtual coin and the game role. If an obstacle exists, the game role cannot pick up the virtual coin, and the game role may pick up the virtual coin only when it is determined from a result of the ray detection that there is no longer an obstacle. As shown in FIG. 9, a game role 910 controlled by a user moves and comes into contact with a collider component 930 of a virtual coin 920 in a collision manner. In this case, ray detection between the game role and the virtual coin is activated.

The arrow line from the virtual coin 920 to the game role 910 in FIG. 9 represents a connection line (e.g., based on a Raycast interface of a physical engine PhysX) between the game role 910 and the virtual coin 920. Because an obstacle 940 exists between the game role 910 and the virtual coin 920, the virtual coin 920 will not be adsorbed and picked up by the game role 910. Provided that the game role 910 is still within a range of the collider component 930 of the virtual coin 920, the server continuously performs ray detection. If the game role bypasses the obstacle 940 to reach another side, as shown in FIG. 9, no obstacle exists between the game role 910 and the virtual coin 920 after the game role 910 bypasses the obstacle 940. That is, when it is determined that there is no longer an obstacle according to a return value of the Raycast interface of the PhysX, the virtual coin 920 will be adsorbed and picked up by the game role 910.

Figure 10:
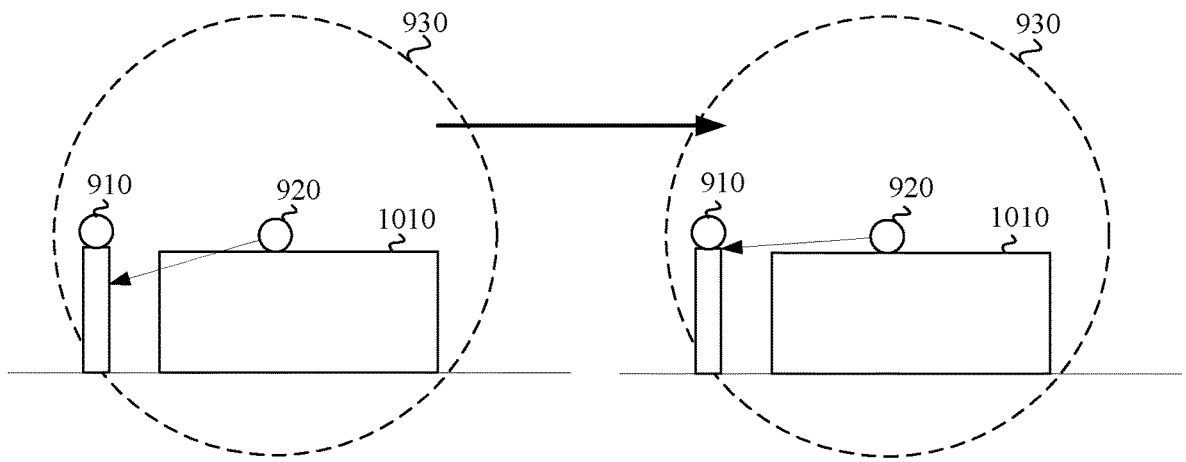
FIG. 10 is a schematic diagram of a ray detection method according to an exemplary embodiment of the disclosure.

As shown in FIG. 10, the game role 910 enters the range of the collider component 930 of the virtual coin 920. When observed from the game scene, no obstacle exists between the game role 910 and the virtual coin 920. However, the connection line (indicted by an arrow in FIG. 10, which is generated in background on the server, and is invisible in the game scene) is blocked by a corner of a scene platform 1010 (an object such as a vehicle or a box), the virtual coin 920 cannot be picked up.

In view of this, relaxation processing may be performed on the game, that is, to raise a reference point of the game role 910. A position of the reference point may be changed by changing configurations.

As shown in FIG. 10, after the reference point is moved upward, the virtual coin 920 may be picked up by the game role 910. Generally, the reference point after being moved upward is located at or above the waist of the game role 910.

Optionally, before determining whether a second object exists between the target virtual object and the target virtual resource, the server needs to determine whether a time of existence of the target virtual resource, which is described below, exceeds a period of existence, and when it is determined that the time of existence of the target virtual resource does not exceed the period of existence, determines whether a second object exists between the target virtual object and the target virtual resource.

Figure 11:
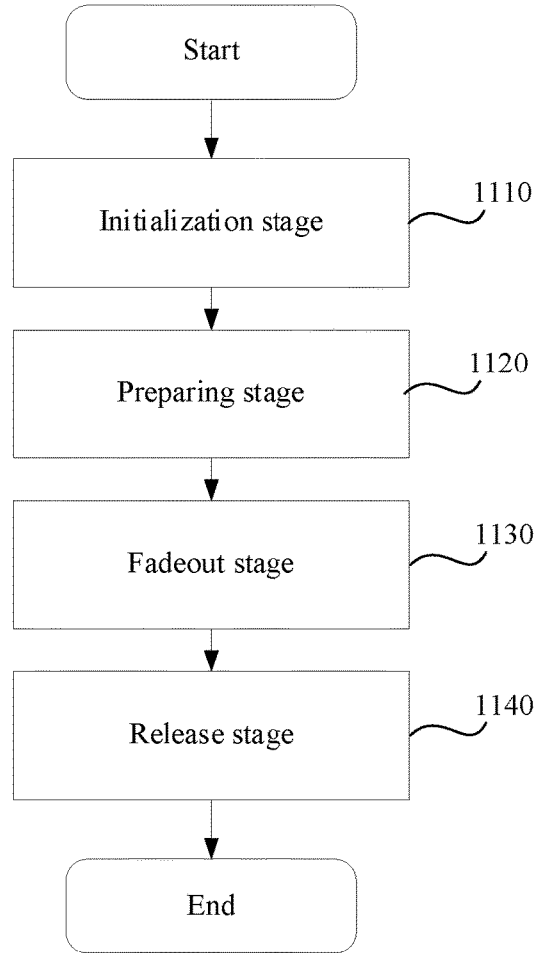
FIG. 11 is a schematic diagram of a period of existence of a virtual resource according to an exemplary embodiment of the disclosure.

A virtual resource has a period of existence, and when the virtual resource does not collide with a virtual object (no virtual object picks up the virtual resource), state transformation of the virtual resource is performed according to a period of existence shown in FIG. 11. As shown in FIG. 11, the period of existence of the virtual resource includes for states: an initialization stage 1110, a preparing stage 1120, a fadeout stage 1130, and a release stage (ReleaseCoin) 1140.

Figure 12:
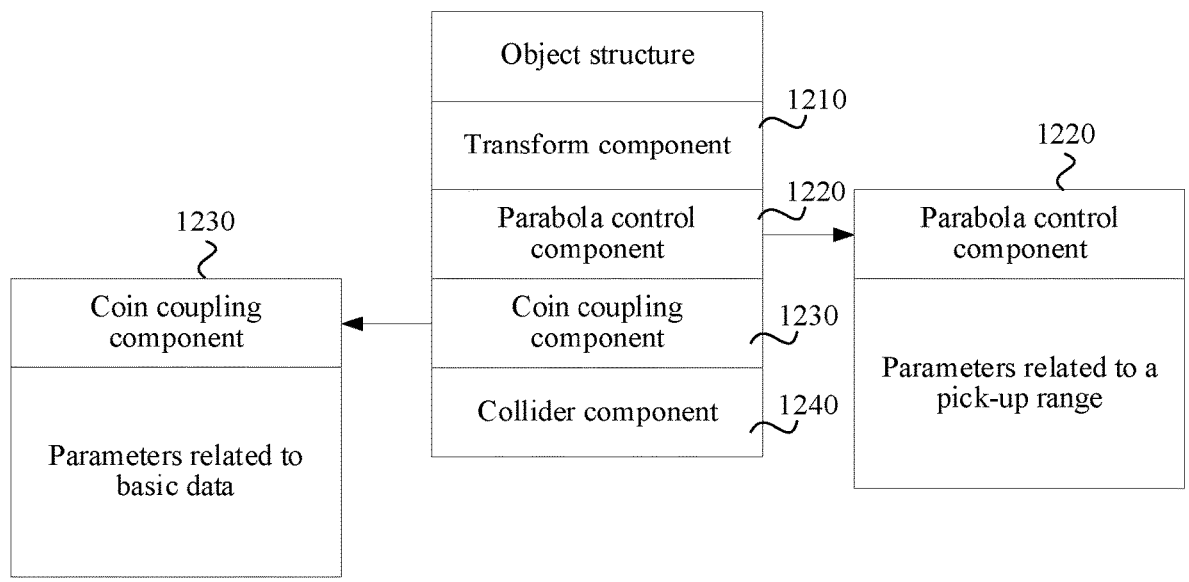
FIG. 12 is an architectural diagram of components of a virtual resource according to an exemplary embodiment of the disclosure.

As shown in FIG. 12, an object structure (game object) of the virtual resource includes a transform component 1210, a parabola control (ParabolaMoveController) component 1220, a coin coupling (InterActorCoin) component 1230, and a collider (SphereCollider) component 1240. The parabola control component 1220 controls motion of a virtual coin; the coin coupling component 1230 defines basic data (such as a start speed of dispersion, a vertical speed range, recovered health points, and a height of the reference point); and the collider component 1240 defines a pick-up range of the virtual resource.

Each stage of a period of existence of a virtual resource is described by using an example in which the virtual resource is a virtual coin, and an application program is a game.

At the initialization stage 1110, the server randomly selects several points from a scene of the game (a quantity of generated points may be configured) to generate virtual coins.

At the preparing stage 1120, a plurality of virtual coins generated at each point move in random directions, and finally the virtual coins may be uniformly scattered in the game scene.

At the fadeout stage 1130, the virtual coins gradually become transparent.

At the release stage 1140, the virtual coins gradually disappear, until they disappear completely.

Operation 803c: Determines, in response to determining that no second object exists between the target virtual object and the target virtual resource, that the target virtual object meets the pick-up condition.

The servers determines that no second object exists between the target virtual object and the target virtual resource, and ray detection is completed, to determine that the target virtual object meets the pick-up condition.

Optionally, when determining that no second object exists between the target virtual object and the target virtual resource, the server determines whether another virtual object is within the pick-up range of the virtual resource; when another virtual object is within the pick-up range, the server obtains a first time point at which the target virtual object enters the pick-up range and a second time point at which the another virtual object enters the pick-up range; and when the first time point is earlier than the second time point, the server determines that the target virtual object meets the pick-up condition.

A plurality of virtual objects may be within the pick-up range of the target virtual resource. The server determines, by obtaining time points at which the plurality of virtual objects enters the pick-up range, that a virtual object entering the pick-up range at an earliest time point meets the pick-up condition.

Operation 804: The server updates a quantity of virtual resources of the target virtual object in response to determining that the target virtual object meets the pick-up condition, to obtain an updated quantity of virtual resources.

When the target virtual object meets the pick-up condition, it is determined that the target virtual object picks up the target virtual resource. The server adds the picked-up target virtual resource to the quantity of virtual resources of the target virtual object, to obtain the updated quantity of virtual resources.

Operation 805: The server transmits a pick-up instruction to the terminal.

The server transmits a pick-up instruction to the terminal in response to determining that the target virtual object meets the pick-up condition.

Operation 806: The terminal updates the quantity of virtual resources of the target virtual object after controlling, according to the pick-up instruction, the target virtual object to pick up the target virtual resource.

The terminal controls, according to the pick-up instruction, the target virtual object to pick up the target virtual resource, and simultaneously adds the picked-up target virtual resource to the quantity of virtual resources of the target virtual object, to obtain an updated quantity of virtual resources.

Based on the above, in this embodiment of the disclosure, the server determines, based on the target state information of the target virtual object transmitted by the terminal, whether the target virtual object meets the pick-up condition for picking up the target virtual resource; updates the quantity of the virtual resources of the target virtual object when the target virtual object meets the pick-up condition; and transmits a pick-up instruction to the terminal. The terminal controls, according to the pick-up instruction, the target virtual object to pick up the target virtual resource. A pick-up behavior of the target virtual object is determined based on a pick-up condition of the server, so that accuracy of picking up the target virtual resource by the target virtual object is improved.

To make virtual coins look more real in a game scene, in this embodiment of the disclosure, after the virtual coins are generated at the preparing stage, a segment of jumping motion logic is implemented. Because each virtual coin is a network entity, that is, a state of the virtual coin needs to be synchronized on the terminal and the server, and the virtual coin may be picked up be a game role at any time during motion, manifestation cannot be performed only by using a segment of animation on the terminal. Instead, the motion logic needs to be executed by the server, and then a motion state is synchronized to the terminal to implement motion manifestation. In addition, because a large quantity of virtual coins may be generated in the game scene, motion manifestation cannot be implemented by synchronizing temporal positions of the virtual coins, which generates a large volume of data traffic, and consequently affects performance of the server.

Figure 13:
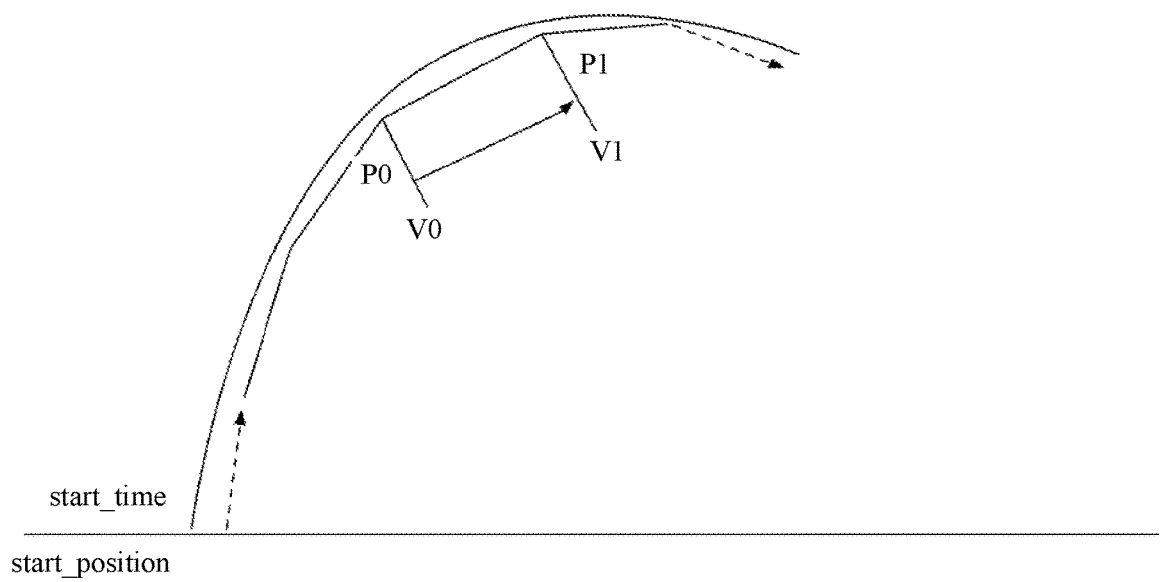
FIG. 13 is a simulation diagram of motion of a virtual coin according to an exemplary embodiment of the disclosure.
Figure 14:
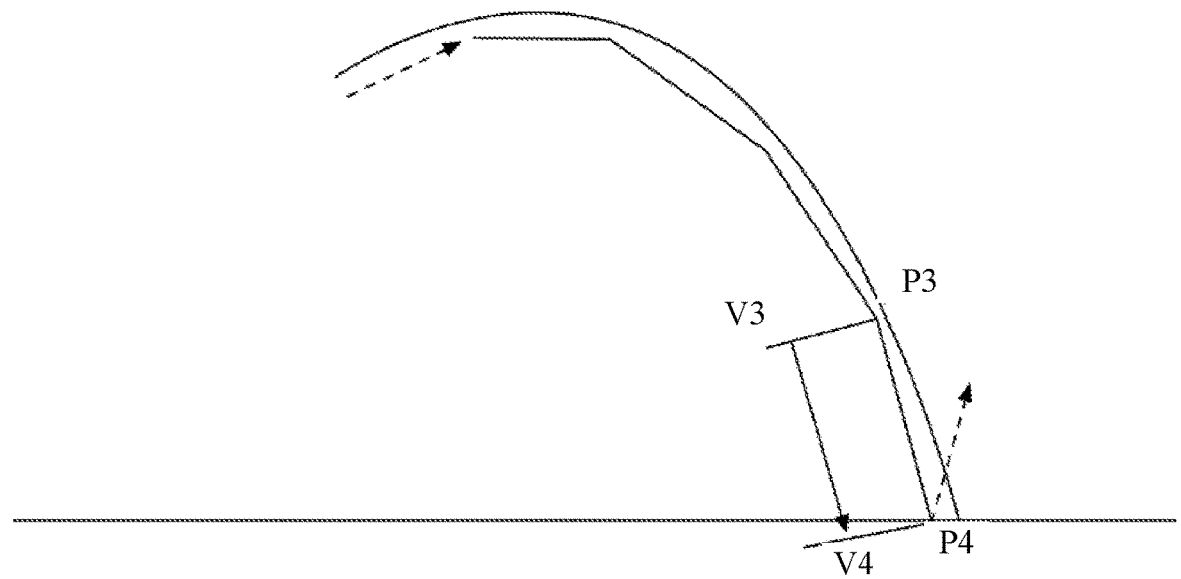
FIG. 14 is a simulation diagram of motion of a virtual coin according to an exemplary embodiment of the disclosure.

In this embodiment of the disclosure, by using a solution of physical simulation calculation, motion of virtual coins is implemented without depending on functions of a physical engine, and is implemented based on the terminal and the server simultaneously executing the same segment of motion logic. An example implementation of motion of the virtual coin is shown in FIG. 13: curve motion starts at a start position at a start time point; one piece of curve motion is divided into a plurality of segments, and the curve motion is fitted by using a plurality of segments of linear motion; a speed and a new position are calculated by using a direct motion formula for each small segment of straight line (as shown in FIG. 13, a speed V1 at a position P1 is calculated according to a start speed V0 at a position P0); and after each calculation is completed, a speed and a position of the current calculation are used as a start speed and a start position of a next small segment for simulation calculation again. As shown in FIG. 14, after collision with the floor or another collider body during motion occurs at a position P4, a new speed after attenuation is calculated according to a configured attenuation ratio, and a direction of the speed may be calculated by using a reflection formula.

The entire motion stops when the speed is attenuated to a specific value or a motion time reaches a maximum motion time. When the motion starts, the server synchronizes a start time point and a start position to the terminal, and then the terminal executes logic the same as that of the server to implement motion simulation of the virtual coin. That is, the terminal receives the start position P0 and the start speed V0 transmitted by the server, the speed V1 at the position P1 is calculated according to the start speed V0 at the position P0. By analogy, the curve motion is fitted by using a plurality of segments of linear motion, and a speed and a new position are calculated by using a direct motion formula for each small segment of straight line, to obtain a final position of the virtual coin.

Generation of a virtual resources (for example, virtual coins) may have two approaches: one is that a batch of virtual resources are generated when a single round of the game is entered; the other is that virtual resources are generated when each game role is killed.

Figure 15:
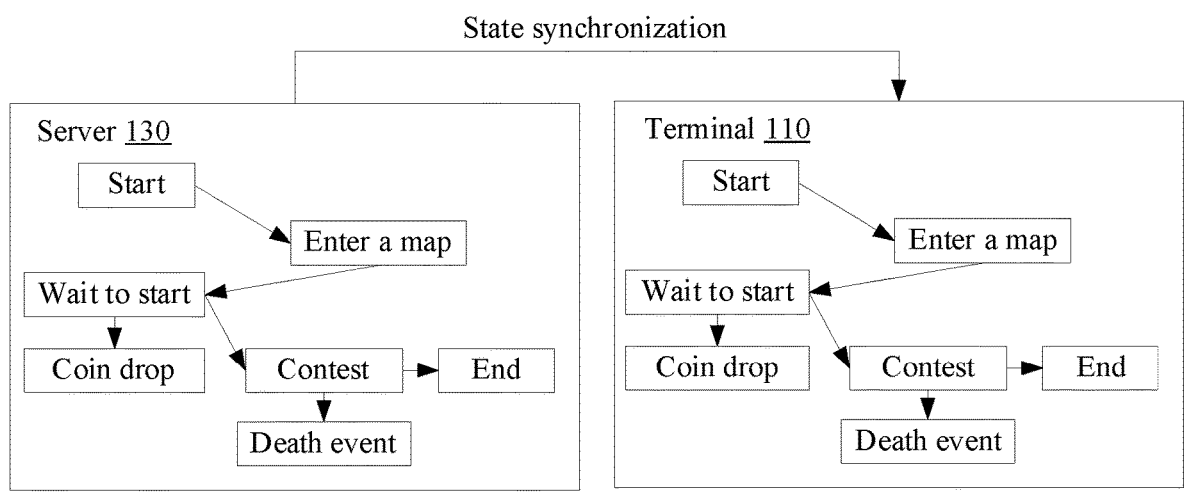
FIG. 15 is a schematic diagram of synchronization of state data of a virtual coin according to an exemplary embodiment of the disclosure.

As shown in FIG. 15, the server 130 triggers generation of resources in a manner of a state machine and an event. The server maintains a state machine, and starts execution from a start state when a game begins. A logic state jump is driven by triggering a corresponding event, and after a state is entered, logic included in the state is executed. When the logic is transferred to a wait-to-start (WaitingToStart) event, a processing function of a coin drop (Event_DropCoin) event is executed. In logic of this function, a specified quantity of virtual resources are provided in a single round of game according to a pre-configured time interval and a pre-configured quantity of times. For operations of executing the coin drop event by the server, reference may be made to optional operations in the embodiment in FIG. 2. The server randomly generates a start position and a start speed of a virtual resource, calculates a motion trajectory of the virtual resource according to the start position and the start speed, and calculates a final position of the virtual resource according to the start position and the motion trajectory.

When the state is transferred to a contesting state, an official contest stage is entered. At this stage, the server monitors a death event (PawnEvent_Death). When a game role is killed (health points or an endurance value is zero), virtual resources of a specific ratio are generated at a position at which the game role is killed, and may be picked up by another game role. For operations of generating virtual resources by the server based on a game role being killed, reference may be made to the embodiment in FIG. 18 below.

The server is in a state synchronization pattern, state machines on the terminal 110 and the server 130 are consistent, and the server synchronizes state data to the terminal 110 for each frame. Therefore, when the server is in a state change, the terminal 110 may also receive updated state data, and makes performances of the terminal 110 based on the data. Therefore, after the server receives a message of jumping to the wait-to-start event, the terminal 110 also jumps to a wait-to-start state. After receiving a coin drop event, the server 130 instantiates a batch of virtual resources in the server 130, and then synchronizes, by using a generation (Spawn) function of the server 130, a message of generating the virtual resources to the terminal 110. After receiving the state data, the terminal 110 simultaneously creates virtual resources in a game scene. Similarly, virtual resources are also generated on the terminal 110 in this manner during death of a game role.

Figure 16:
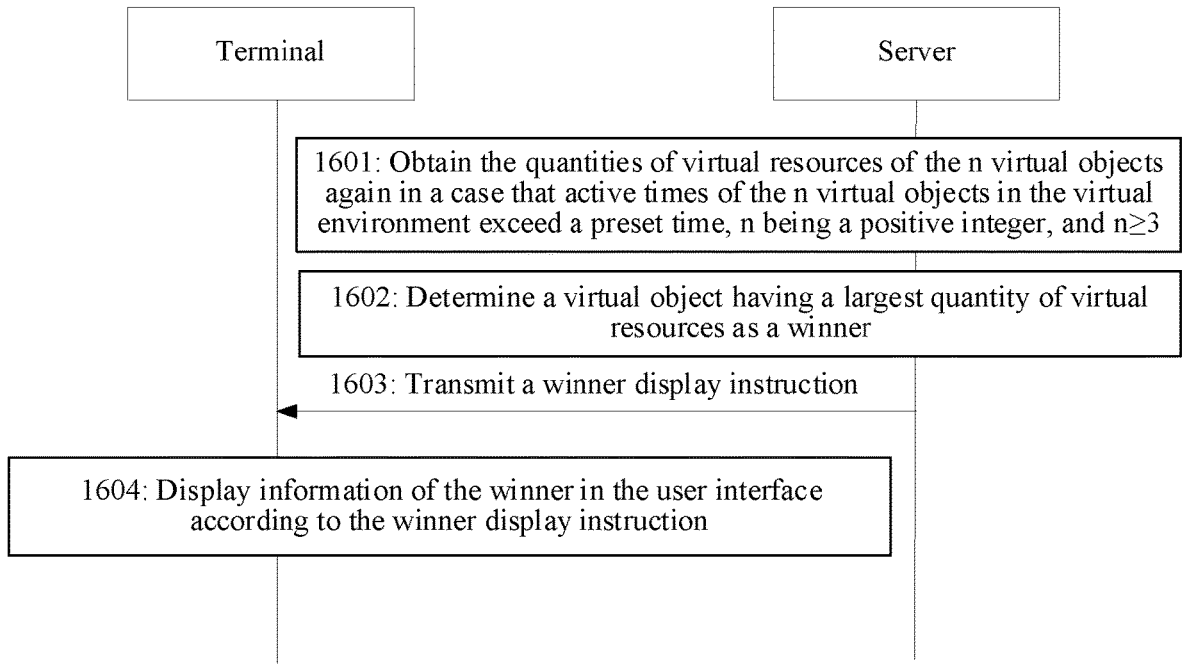
FIG. 16 is a flowchart of a user interface display method according to an exemplary embodiment of the disclosure.

FIG. 16 is a flowchart of a user interface display method according to an exemplary embodiment of the disclosure. The method is applicable to the computer system shown in FIG. 1. The method may be an operation performed after operation 207a and operation 207b in the embodiment in FIG. 2. The method includes the following operations 1601-1604:

Operation 1601: The server obtains the quantities of virtual resources of the n virtual objects again in a case that active times of the n virtual objects in the virtual environment exceed a preset time, n being a positive integer, and n≥3.

For example, active times of the n virtual objects in the virtual environment are limited, and when the active times exceed the preset time, the server performs statistics on the quantities of virtual resources of the n virtual objects.

Operation 1602: The server determines a virtual object having a largest quantity of virtual resources as a winner.

For example, four virtual objects are included in the virtual environment, and quantities of virtual resources obtained by the four virtual objects are respectively that: a quantity of virtual resources of a virtual object 1 is 100, a quantity of virtual resources of a virtual object 2 is 98, a quantity of virtual resources of a virtual object 3 is 102, and a quantity of virtual resources of a target virtual object is 120. Therefore, the target virtual object is determined as a winner.

Operation 1603: The server transmits a winner display instruction to the terminal.

After determining the winner, the server transmits a winner display instruction to the terminal, to instruct the terminal to display the winner. The winner display instruction includes identification information of the winner.

Operation 1604: The terminal displays information of the winner in the user interface according to the winner display instruction.

Figure 17:
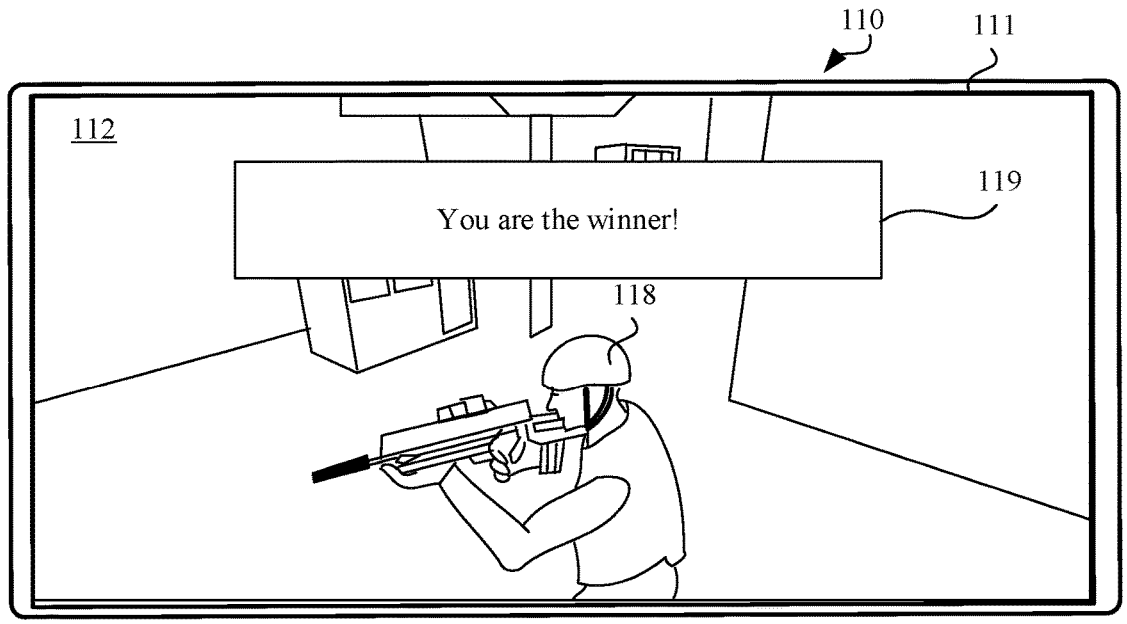
FIG. 17 is a schematic diagram of a user interface according to an exemplary embodiment of the disclosure.

The terminal displays the information of the winner in the user interface according to the identification information of the winner included in the winner display instruction. For example, as shown in FIG. 17, a winner is a target virtual object corresponding to the terminal 110; and after a winner display instruction is received, the user interface 112 displays a winner information window 119, and information "You are the winner!" for the winner is displayed in the winner information window 119.

Based on the above, in this embodiment of the disclosure, when the active times of the n virtual objects in the virtual environment exceed the preset time, the server obtains the quantities of virtual resources of the n virtual objects, determines a virtual object having a largest quantity of virtual resources as the winner, and transmits a winner display instruction to the terminal. The terminal displays information of the winner according to the winner display instruction, thereby improving accuracy of obtaining the winner in a battle in the virtual environment.

Figure 18:
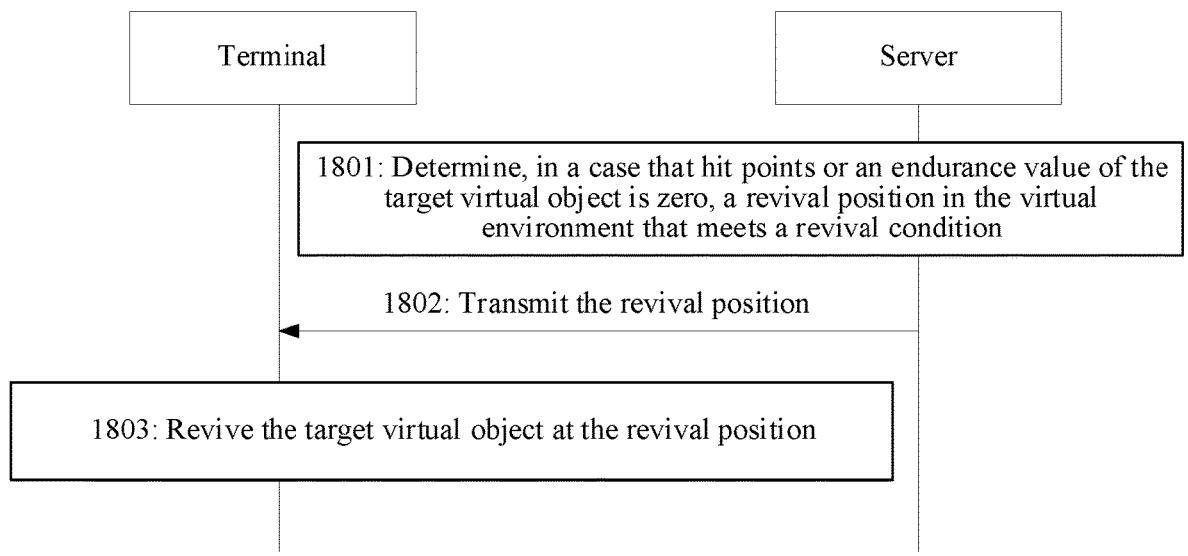
FIG. 18 is a flowchart of a user interface display method according to an exemplary embodiment of the disclosure.

FIG. 18 is a flowchart of a user interface display method according to an exemplary embodiment of the disclosure. The method is applicable to the computer system shown in FIG. 1. The method may be an optional operation in the embodiment in FIG. 2. The method includes the following operations 1801-1803:

Operation 1801: The server determines, in a case that hit points or an endurance value of the target virtual object is zero, a revival position in the virtual environment that meets a revival condition.

The server selects any position in the virtual environment as a target position, and determines whether another virtual object exists within a first range with the target position as a center and a first distance as a radius; determines, in a case that no other virtual objects exist within the first range, whether another virtual object exists within a second range with the target position as a center and a second distance as a radius, the first distance being shorter than the second distance; and determines the target position as a revival position in a case that another virtual object exists within the second range.

The revival position is described by using an example in which an application program is a game, and a virtual object is a game role.

An objective of setting the revival position is to prevent a game role that has just been revived from being killed by another game role nearby, and simultaneously enable the game role that has just been revived to encounter another game role within a period of time after the revival as much as possible, so that a game rhythm is not interrupted due to no finding of another game role for an excessively long time.

Figure 19:
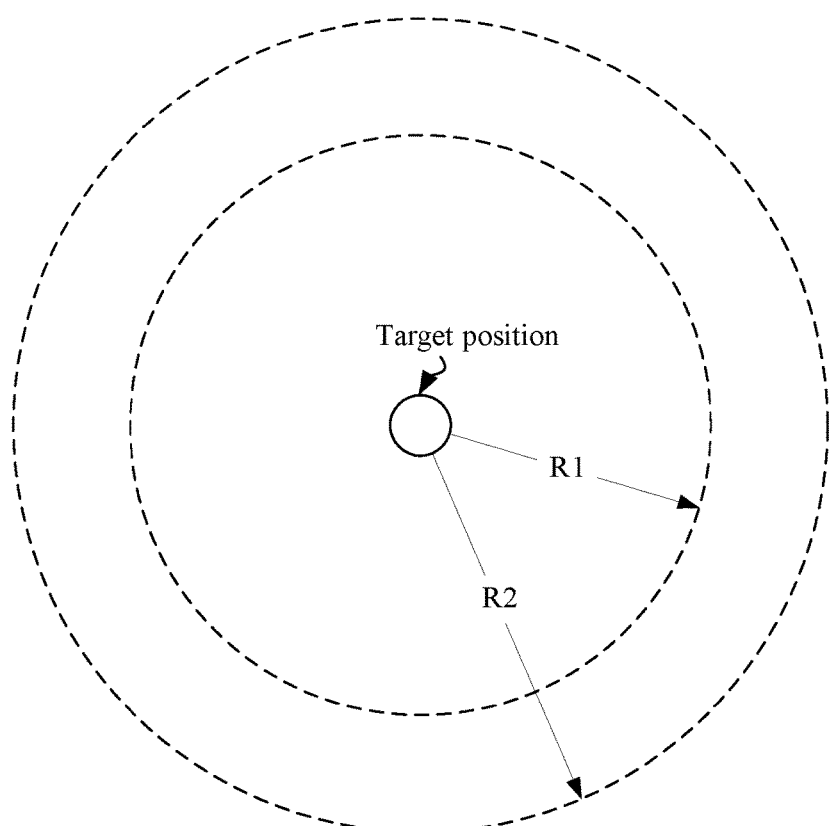
FIG. 19 is a schematic diagram of a revival position according to an exemplary embodiment of the disclosure.

To achieve the technical objective, two distances are defined in this embodiment of the disclosure: one is a minimum detection distance (first distance) during revival, and the other is a maximum detection distance (second distance) during revival. As shown in FIG. 19, the minimum detection distance R1 is used for detecting that no other game roles may exist within the range with the distance as a radius, and the maximum detection distance R2 is used for detecting that at least one game role needs to exist within the range with the distance as a radius.

A process for executing revival of a game role is that: asEnemyInFar and hasEnemyInNear (first distance) are first initialized to false (that is, there is no other game roles), and only when hasEnemyInNear=false and hasEnemyInFar (second distance)=true (another game role exists), it is determined that a position that meets a revival condition is found. If no position meeting the revival condition is found after search is performed for a plurality of times, a position is randomly selected, thereby preventing performance of the server from being affected due to continuous search based on the algorithm. A quantity of times of search may reach an appropriate value through configuration.

Optionally, in a case that the hit points or the endurance value of the target virtual object is zero, the server reduces a quantity of virtual resources of the target virtual object at a preset ratio, to obtain an updated quantity of virtual resources, and transmits an update instruction to the terminal; and the terminal updates the quantity of virtual resources of the target virtual object according to the update instruction.

For example, when the target virtual object is killed by another virtual object, a quantity of some virtual resources needs to be deducted. After calculating the quantity of virtual resources that need to be deducted, the server obtains the updated quantity of virtual resources, and synchronizes the updated quantity of virtual resources to the terminal.

Optionally, in a case that the hit points or the endurance value of the target virtual object is zero, the server obtains a disappearance position at which the hit points or the endurance value of the target virtual object drops to zero, and transmits a second generation instruction to the terminal; and the terminal generates a virtual resource at the disappearance position according to the second generation instruction.

For example, when the target virtual object is killed by another virtual object, a new virtual resource needs to be generated at a position at which the target virtual object is killed (that is, the disappearance position). After obtaining the disappearance position, the server transmits a second generation instruction to the terminal; and the terminal generates a new virtual resource at the disappearance position according to the second generation instruction.

Operation 1802. The server transmits the revival position to the terminal.

After determining the revival position, the server transmits the revival position to the terminal.

Operation 1803: The terminal revives the target virtual object at the revival position.

The terminal revives the target virtual object at the revival position according to the revival position transmitted by the server.

Based on the above, in this embodiment of the disclosure, after the server determines the revival position in the virtual environment, the server transmits the revival position to the terminal; and the terminal revives the target virtual object at the revival position. Because the revival position is a position meeting the condition that: no other virtual objects exist within the first range and another virtual object exists within the second range, such that the revived target virtual object is ensured not to be immediately killed by another virtual object upon revival. Accordingly, a case where the target virtual object cannot have a battle within a relatively long time after the revival is avoided, thereby improving fairness of a battle in the virtual environment.

It is to be understood that, while operations in flowcharts of FIG. 2, FIG. 8, FIG. 16 and FIG. 18 are displayed in sequence based on indication of arrows, the operations are not necessarily performed in sequence based on a sequence indicated by the arrows. Unless otherwise explicitly specified in the disclosure, execution of the operations is not strictly limited, and the operations may be performed in other sequences. In addition, at least some operations in FIG. 2, FIG. 8, FIG. 16 and FIG. 18 may include a plurality of suboperations or a plurality of stages. The suboperations or the stages are not necessarily performed at the same moment, but may be performed at different moments. The suboperations or the stages are not necessarily performed in sequence, but may be performed in turn or alternately with another operation or at least some of suboperations or stages of the another operation.

Figure 20:
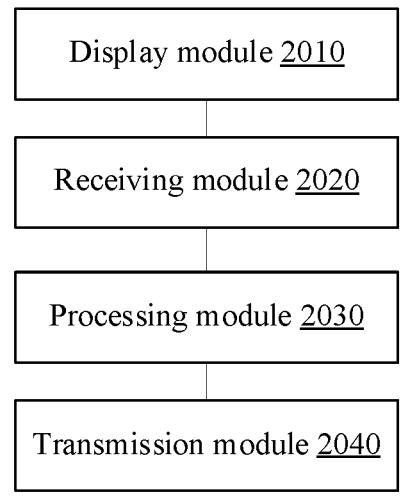
FIG. 20 is a block diagram of a user interface display apparatus according to an exemplary embodiment of the disclosure.

FIG. 20 is a block diagram of a user interface display apparatus in a virtual environment according to an exemplary embodiment of the disclosure. The apparatus may be implemented as the first terminal 110 in the embodiment of FIG. 1 by using software, hardware, or a combination thereof. The apparatus includes: a display module 2010, a receiving module 2020, a processing module 2030, and a transmission module 2040.

The display module 2010 is configured to display a user interface, the user interface displaying a picture (or an image) of a virtual environment observed from a perspective corresponding to a target virtual object.

The receiving module 2020 is configured to receive a display instruction transmitted by a server, the display instruction including data of a first-class object and data of a second-class object, the first-class object being a virtual object having obtained a larger quantity of virtual resources than the target virtual object, the second-class object being a virtual object having obtained a same or smaller quantity of virtual resources than the target virtual object, the first-class object and the second-class object belonging to camps (or teams) different from a camp (team) to which the target virtual object belongs.

The display module 2010 is further configured to: in a case that the first-class object is not within a field of view from the perspective: display first visible information in the user interface; or display first visible information and second visible information in the user interface (when the second-class object is within the field of view), an amount of the first visible information being larger than that of the second visible information. The first visible information is generated according to the data of the first-class object, and the second visible information is generated according to the data of the second-class object.

In an optional embodiment, an image of the virtual environment displays an opaque first object; and The display module 2010 is further configured to: display the first visible information through the first object in a case that the first-class object enters the field of view from the perspective and is located behind the first object.

In an optional embodiment, the display module 2010 is further configured to: display the body model information of the first-class object in the virtual environment, and/or first state information of the first-class object through the first object, the first state information including at least one of health points or an endurance value of the first-class object, a quantity of virtual resources of the first-class object, a defense value of the first-class object, and prop information of the first-class object.

In an optional embodiment, the display module 2010 is further configured to:

generate, according to the data of the first-class object by using a silhouette effect, the body model information overlaid on the first object, the body model information being body model information of the first-class object in the virtual environment; and display the first object and the body model information overlaid on the first object.

In an optional embodiment, the body model information of the first-class object includes a contour of the first-class object, or a contour of the first-class object and a posture of the first-class object.

In an optional embodiment, the user interface further displays a map of the virtual environment; and the display module 2010 is further configured to: display an identifier of the first-class object in a first region on the map, the first region being corresponding to a position of the first-class object in the virtual environment.

In an optional embodiment, the display module 2010 is further configured to: display an information window in the user interface, the first visible information being displayed in the information window.

The first visible information includes a position of the first-class object and/or first state information of the first-class object, the first state information including at least one of health points or an endurance value of the first-class object, a quantity of virtual resources of the first-class object, a defense value of the first-class object, and prop information of the first-class object.

In an optional embodiment, the receiving module 2020 is further configured to receive a first generation instruction transmitted by the server.

The processing module 2030 is further configured to: calculate, according to a start position of each virtual resource and a start speed of the each virtual resource included in the first generation instruction, a motion trajectory of the each virtual resource.

The display module 2010 is further configured to: display the motion trajectory of the each virtual resource in the user interface.

In an optional embodiment, the processing module 2030 is further configured to: calculate a final position of the each virtual resource according to the start position and the motion trajectory.

The display module 2010 is further configured to: display the each virtual resource at the final position.

In an optional embodiment, the transmission module 2040 is configured to: transmit target state information of the target virtual object to the server, the target state information being used for indicating a position of the target virtual object in the virtual environment.

The receiving module 2020 is further configured to: receive a pick-up instruction transmitted by the server, the pick-up instruction being an instruction transmitted to the terminal in a case that the server determines, according to the target state information, that the target virtual object meets a pick-up condition for picking up a target virtual resource.

The processing module 2030 is configured to: control, according to the pick-up instruction, the target virtual object to pick up the target virtual resource; and update the quantity of virtual resources of the target virtual object.

In an optional embodiment, the receiving module 2020 is further configured to: receive a winner display instruction transmitted by the server, the winner display instruction being an instruction transmitted to the terminal after the server obtains, in a case that active times of n virtual objects in the virtual environment exceed a preset time, quantities of virtual resources of the n virtual objects and determines a virtual object having a largest quantity of virtual resources as a winner, n being a positive integer, and n≥3.

The display module 2010 is further configured to: display information of the winner in the user interface according to the winner display instruction In an optional embodiment, receiving module 2020 is further configured to: receive a revival position transmitted by the server in a case that hit points or an endurance value of the target virtual object is zero, the revival position being a position meeting a revival condition in the virtual environment that is determined by the server.

The processing module 2030 is configured to: revive the target virtual object at the revival position.

In an optional embodiment, the revival condition includes: no other virtual objects exist within a first range with a target position as a center and a first distance as a radius; and another virtual object exists within a second range with the target position as a center and a second distance as a radius, the first distance being shorter than the second distance.

In an optional embodiment, the receiving module 2020 is further configured to: receive an update instruction transmitted by the server, the update instruction being an instruction transmitted to the terminal after the server reduces, in a case that the hit points or the endurance value of the target virtual object is zero, a quantity of virtual resources of the target virtual object at a preset ratio, to obtain an updated quantity of virtual resources.

The processing module 2030 is further configured to: update the quantity of virtual resources of the target virtual object according to the updated quantity of virtual resources included in the update instruction.

In an optional embodiment, the receiving module 2020 is further configured to: receive a second generation instruction transmitted by the server, the second generation instruction being an instruction transmitted to the terminal after the server obtains, in a case that the hit points or the endurance value of the target virtual object is zero, a disappearance position at which the hit points or the endurance value of the target virtual object drops to zero.

The processing module 2030 is further configured to: generate a virtual resource at the disappearance position according to the second generation instruction.

Figure 21:
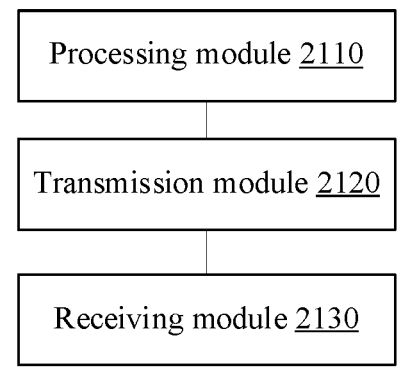
FIG. 21 is a block diagram of a user interface display apparatus according to an exemplary embodiment of the disclosure.

FIG. 21 is a block diagram of a user interface display apparatus in a virtual environment according to an exemplary embodiment of the disclosure. The apparatus may be implemented as the server 130 in the embodiment in FIG. 1 by using software, hardware, or a combination thereof. The apparatus includes: a processing module 2110, a transmission module 2120, and a receiving module 2130.

The processing module 2110 is configured to: obtain quantities of virtual resources of n virtual objects in a virtual environment, n being a positive integer, and n≥3; sort the n virtual objects in descending order of the quantities of virtual resources, to obtain sequence numbers of the n virtual objects; and determine a first-class object and a second-class object of a target virtual object in the n virtual objects according to the sequence numbers of the n virtual objects, the first-class object being a virtual object whose sequence number is smaller than that of the target virtual object, the second-class object being a virtual object whose sequence number is the same as or greater than that of the target virtual object, and the first-class object and the second-class object belonging to camps different from a camp to which the target virtual object belongs.

The transmission module 2120 is configured to transmit a display instruction to a terminal corresponding to the target virtual object, the display instruction being used for instructing the terminal to: generate first visible information according to data of the first-class object included in the display instruction, generate second visible information according to data of the second-class object included in the display instruction, and in a case that the first-class object is not within a field of view from a perspective corresponding to the target virtual object, display the first visible information in the user interface, or display the first visible information and the second visible information in the user interface (when the second-class object is within the field of view), an amount of the first visible information being larger than that of the second visible information.

In an optional embodiment, the receiving module 2130 is configured to: receive target state information transmitted by the terminal, the target state information being used for indicating a position of the target virtual object in the virtual environment.

The processing module 2110 is further configured to: update a quantity of virtual resources of the target virtual object to obtain an updated quantity of virtual resources in response to determining, according to the target state information, that the target virtual object is within a pick-up range of a target virtual resource and the target virtual object meets a pick-up condition for picking up the target virtual resource.

The transmission module 2120 is further configured to: transmit a pick-up instruction to the terminal, the pick-up instruction being used for instructing the terminal to: update the quantity of virtual resources of the target virtual object after controlling the target virtual object to pick up the target virtual resource.

In an optional embodiment, the target state information includes identification information of the target virtual object; and The processing module 2110 is further configured to: determine, in response to determining, according to the identification information, that the target virtual object is alive, and determining that no second object exists between the target virtual object and the target virtual resource, that the target virtual object meets the pick-up condition.

In an optional embodiment, the processing module 2110 is further configured to: determine, in response to determining that the target virtual object is alive and a time of existence of the target virtual resource does not exceed a period of existence, whether a second object exists between the target virtual object and the target virtual resource.

In an optional embodiment, the target state information includes first reference coordinates of the target virtual object in the virtual environment; and the processing module 2110 is further configured to: obtain a connection line between the target virtual object and the target virtual resource according to first reference coordinates and second reference coordinates of the target virtual object in the virtual environment; and determine, in response to determining that no second object exists on the connection line, that no second object exists between the target virtual object and the target virtual resource.

In an optional embodiment, the target virtual object is a target virtual character, and the target virtual resource is a target virtual coin; and the first reference coordinates are coordinates of a reference point of the target virtual character, the reference point being located at or above the waist of the virtual character; and the second reference coordinates are coordinates of a center point of the target virtual coin.

In an optional embodiment, the processing module 2110 is further configured to: in response to determining that no second object exists between the target virtual object and the target virtual resource, and another virtual object is within the pick-up range, obtain a first time point at which the target virtual object enters the pick-up range and a second time point at which the another virtual object enters the pick-up range; and when the first time point is earlier than the second time point, determine that the target virtual object meets the pick-up condition.

In an optional embodiment, the processing module 2110 is further configured to randomly generate a start position and a start speed of a virtual resource.

The transmission module 2120 is further configured to: transmit a first generation instruction to the terminal, the first generation instruction including the start position and the start speed, the first generation instruction being used for instructing the terminal to: after calculating a motion trajectory of the virtual resource according to the start position and the start speed, display the motion trajectory of the virtual resource in the user interface.

In an optional embodiment, the processing module 2110 is further configured to: calculate a motion trajectory of the virtual resource according to the start position and the start speed, and calculate a final position of the virtual resource according to the start position and the motion trajectory.

In an optional embodiment, the processing module 2110 is further configured to: obtain the quantities of virtual resources of the n virtual objects again in a case that active times of the n virtual objects in the virtual environment exceed a preset time; and determine a virtual object having a largest quantity of virtual resources as a winner.

The transmission module 2120 is further configured to: transmit a winner display instruction to the terminal, the winner display instruction being used for instructing the terminal to display information of the winner in the user interface.

In an optional embodiment, the processing module 2110 is further configured to: determine, in a case that hit points or an endurance value of the target virtual object is zero, a revival position in the virtual environment that meets a revival condition.

The transmission module 2120 is further configured to transmit the revival position to the terminal, the revival position being used for triggering the terminal to revive the target virtual object at the revival position.

In an optional embodiment, the processing module 2110 is further configured to: determine the target position as the revival position, in response to determining that no other virtual objects exist within a first range with a target position in the virtual environment as a center and a first distance as a radius and determining that another virtual object exists within a second range with the target position as a center and a second distance as a radius, the first distance being shorter than the second distance.

In an optional embodiment, the processing module 2110 is further configured to: reduce, in a case that the hit points or the endurance value of the target virtual object is zero, a quantity of virtual resources of the target virtual object at a preset ratio, to obtain an updated quantity of virtual resources.

The transmission module 2120 is configured to transmit an update instruction to the terminal, the update instruction being used for instructing the terminal to update the quantity of virtual resources of the target virtual object.

In an optional embodiment, the processing module 2110 is further configured to: obtain, in a case that the hit points or the endurance value of the target virtual object is zero, a disappearance position at which the hit points or the endurance value of the target virtual object drops to zero.

The transmission module 2120 is further configured to transmit a second generation instruction to the terminal, the second generation instruction being used for instructing the terminal to generate a virtual resource at the disappearance position.

Figure 22:
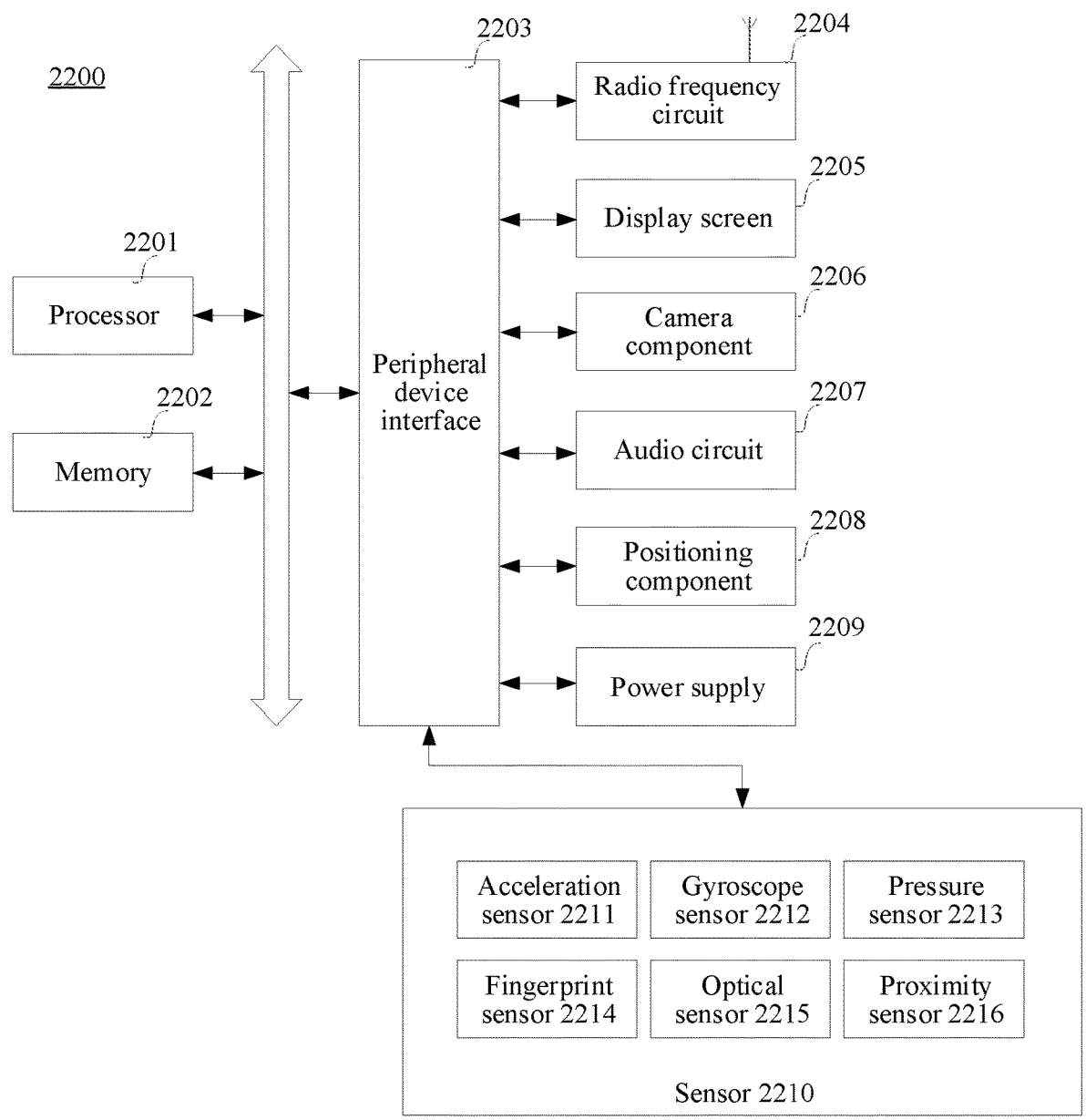
FIG. 22 is a block diagram of a terminal according to an exemplary embodiment of the disclosure.

FIG. 22 is a structural block diagram of a terminal 2200 according to an exemplary embodiment of the disclosure. The terminal 2200 may be a smartphone, a tablet computer, a Moving Picture Experts Group Audio Layer III (MP3) player, a Moving Picture Experts Group Audio Layer IV (MP4) player, a notebook computer, or a desktop computer. The terminal 2200 may also be referred to as user equipment, a portable terminal, a laptop terminal, a desktop terminal, or by another name.

Generally, the terminal 2200 includes a processor 2201 and a memory 2202.

The processor 2201 may include one or more processing cores, and may be, for example, a 4-core processor or an 8-core processor. The processor 2201 may be implemented in at least one hardware form of a digital signal processor (DSP), a field-programmable gate array (FPGA), and a programmable logic array (PLA). The processor 2201 may also include a main processor and a coprocessor. The main processor is a processor configured to process data in an awake state, and is also referred to as a central processing unit (CPU). The coprocessor is a low-power processor configured to process data in a standby state. In some embodiments, a graphics processing unit (GPU) may be integrated with the processor 2201. The GPU is configured to be responsible for rendering and drawing content to be displayed on a display screen. In some embodiments, the processor 2201 may further include an artificial intelligence (AI) processor. The AI processor is configured to process a computing operation related to machine learning.

The memory 2202 may include one or more computer-readable storage media. The computer-readable storage medium may be non-transient. The memory 2202 may further include a high-speed random access memory and a non-volatile memory, such as one or more magnetic disk storage devices or a flash storage device. In some embodiments, the non-transitory computer-readable storage medium in the memory 2202 is configured to store at least one instruction, the at least one instruction being configured to be executed by the processor 2201 to implement any of the above-described method(s), such as the user interface display method or the method for picking up a virtual resource provided in the method embodiments of the disclosure.

In some embodiments, the terminal 2200 may optionally include: a peripheral device interface 2203 and at least one peripheral device. The processor 2201, the memory 2202, and the peripheral device interface 2203 may be connected by using a bus or a signal cable. Each peripheral device may be connected to the peripheral device interface 2203 by using a bus, a signal cable, or a circuit board. Specifically, the peripheral device includes: at least one of a radio frequency (RF) circuit 2204, a touch display screen 2205, a camera 2206, an audio circuit 2207, a positioning component 2208, and a power supply 2209.

The peripheral interface 2203 may be configured to connect at least one peripheral device related to input/output (I/O) to the processor 2201 and the memory 2202. In some embodiments, the processor 2201, the memory 2202, and the peripheral interface 2203 are integrated on the same chip or circuit board. In some other embodiments, any one or two of the processors 2201, the memory 2202, and the peripheral interface 2203 may be implemented on a separate chip or circuit board. This is not limited in this embodiment.

The RF circuit 2204 is configured to receive and transmit an RF signal, which is also referred to as an electromagnetic signal. The RF circuit 2204 communicates with a communication network and other communication devices by using the electromagnetic signal. The RF circuit 2204 converts an electrical signal into an electromagnetic signal for transmission, or converts a received electromagnetic signal into an electrical signal. Optionally, the RF circuit 2204 includes: an antenna system, an RF transceiver, one or more amplifiers, a tuner, an oscillator, a digital signal processor, a codec chip set, a subscriber identity module card, and the like. The RF circuit 2204 may communicate with another terminal by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 2204 may also include a circuit related to near field communication (NFC). This is not limited in the disclosure.

The display screen 2205 is configured to display a user interface (UI). The UI may include a graph, text, an icon, a video, and any combination thereof. When the display screen 2205 is a touch screen, the display screen 2205 is further capable of collecting touch signals on or above a surface of the display screen 2205. The touch signal may be input, as a control signal, to the processor 2201 for processing. In this case, the display screen 2205 may be further configured to provide a virtual button and/or a virtual keyboard, which is also referred to as a soft button and/or a soft keyboard. In some embodiments, there may be one display screen 2205, disposed on a front panel of the terminal 2200. In some other embodiments, there may be at least two display screens 2205, respectively disposed on different surfaces of the terminal 2200 or designed in a foldable shape. In still some other embodiments, the display screen 2205 may be a flexible display screen, disposed on a curved surface or a folded surface of the terminal 2200. Even, the display screen 2205 may be further set to have a non-rectangular irregular shape, namely, a special-shaped screen. The display screen 2205 may be made of materials such as a liquid crystal display (LCD), an organic light-emitting diode (OLED), or the like.

The camera component 2206 is configured to capture images or videos. Optionally, the camera component 2206 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 2206 may further include a flashlight. The flashlight may be a single-color-temperature flashlight or a double-color-temperature flashlight. The double color temperature flash is a combination of a warm light flash and a cold light flash, and may be used for light compensation under different color temperatures.

The audio circuit 2207 may include a microphone and a speaker. The microphone is configured to collect sound waves of a user and an environment, and convert the sound waves into electrical signals and input the electrical signals into the processor 2201 for processing, or input the electrical signals into the RF circuit 2204 to implement voice communication. For the purpose of stereo collection or noise reduction, there may be a plurality of microphones, respectively disposed at different portions of the terminal 2200. The microphone may be further an array microphone or an omni-directional collection type microphone. The speaker is configured to convert electric signals from the processor 2201 or the radio frequency circuit 2204 into sound waves. The speaker may be a conventional thin-film speaker or a piezoelectric ceramic speaker. When the speaker is the piezoelectric ceramic speaker, electrical signals not only may be converted into sound waves that may be heard by human, but also may be converted into sound waves that cannot be heard by human for ranging and other uses. In some embodiments, the audio circuit 2207 may also include an earphone jack.

The positioning component 2208 is configured to determine a current geographic location of the terminal 2200, to implement navigation or a location based service (LBS). The positioning component 2208 may be a positioning component based on the global positioning system (GPS) of the United States, the BeiDou System of China, and the GALILEO System of Russia.

The power supply 2209 is configured to supply power to components in the terminal 2200. The power supply 2209 may be an alternating current power supply, a direct current power supply, a disposable battery, or a rechargeable battery. When the power supply 2209 includes the rechargeable battery, the rechargeable battery may be a wired charging battery or a wireless charging battery. The wired rechargeable battery is a battery charged through a wired circuit, and the wireless rechargeable battery is a battery charged through a wireless coil. The rechargeable battery may be further configured to support a fast charging technology.

In some embodiments, the terminal 2200 may further include one or more sensors 2210. The one or more sensors 2210 include, but are not limited to, an acceleration sensor 2211, a gyroscope sensor 2212, a pressure sensor 2213, a fingerprint sensor 2214, an optical sensor 2215, and a proximity sensor 2216.

The acceleration sensor 2211 may measure acceleration on three coordinate axes of a coordinate system established by the terminal 2200. For example, the acceleration sensor 2211 may be configured to detect components of gravity acceleration on the three coordinate axes. The processor 2201 may control, according to a gravity acceleration signal collected by the acceleration sensor 2211, the touch display screen 2205 to display the user interface in a landscape view or a portrait view. The acceleration sensor 2211 may be further configured to acquire motion data of a game or a user.

The gyroscope sensor 2212 may detect a body direction and a rotation angle of the terminal 2200. The gyroscope sensor 2212 may cooperate with the acceleration sensor 2211 to collect a 3D action by the user on the terminal 2200. The processor 2201 may implement the following functions according to the data collected by the gyroscope sensor 2212: motion sensing (such as changing the UI according to a tilt operation of the user), image stabilization during shooting, game control, and inertial navigation.

The pressure sensor 2213 may be disposed on a side frame of the terminal 2200 and/or a lower layer of the touch display screen 2205. When the pressure sensor 2213 is disposed at the side frame of the terminal 2200, a holding signal of the user on the terminal 2200 may be detected, and the processor 2201 performs left/right hand recognition or a quick operation according to the holding signal collected by the pressure sensor 2213. When the pressure sensor 2213 is disposed at the lower layer of the touch screen 2205, the processor 2201 controls an operable control on the UI interface according to a pressure operation performed by the user on the touch screen 2205. The operable control includes at least one of a button control, a scroll-bar control, an icon control, and a menu control.

The fingerprint sensor 2214 is configured to collect a fingerprint of a user, and the processor 2201 identifies the identity of the user according to the fingerprint collected by the fingerprint sensor 2214, or the fingerprint sensor 2214 identifies the identity of the user according to the collected fingerprint. When the identity of the user is identified as a trusted identity, the processor 2201 authorizes the user to perform a related sensitive operation. The sensitive operation includes unlocking a screen, viewing encryption information, downloading software, payment, changing settings, and the like. The fingerprint sensor 2214 may be disposed on a front surface, a back surface, or a side surface of the terminal 2200. When a physical button or a vendor logo is disposed on the terminal 2200, the fingerprint 2214 may be integrated with the physical button or the vendor logo.

The optical sensor 2215 is configured to collect ambient light intensity. In an embodiment, the processor 2201 may control the display brightness of the touch screen 2205 according to the ambient light intensity collected by the optical sensor 2215. Specifically, when the ambient light intensity is relatively high, the display luminance of the display screen 2205 is increased. When the ambient light intensity is relatively low, the display luminance of the display screen 2205 is reduced. In another embodiment, the processor 2201 may further dynamically adjust a camera parameter of the camera component 2206 according to the ambient light intensity collected by the optical sensor 2215.

The proximity sensor 2216, also referred to as a distance sensor, is usually disposed on a front panel of the terminal 2200. The proximity sensor 2216 is configured to acquire a distance between a user and the front surface of the terminal 2200. In an embodiment, when the proximity sensor 2216 detects that the distance between the user and the front surface of the terminal 2200 gradually becomes smaller, the display screen 2205 is controlled by the processor 2201 to switch from a screen-on state to a screen-off state. In a case that the proximity sensor 2216 detects that the distance between the user and the front surface of the terminal 2200 gradually becomes larger, the display screen 2205 is controlled by the processor 2201 to switch from the screen-off state to the screen-on state.

A person skilled in the art would understand that the structure shown in FIG. 22 does not constitute a limitation to the terminal 2200, and the terminal may include more or fewer components than those shown in the figure, or some components may be combined, or a different component arrangement may be used.

Figure 23:
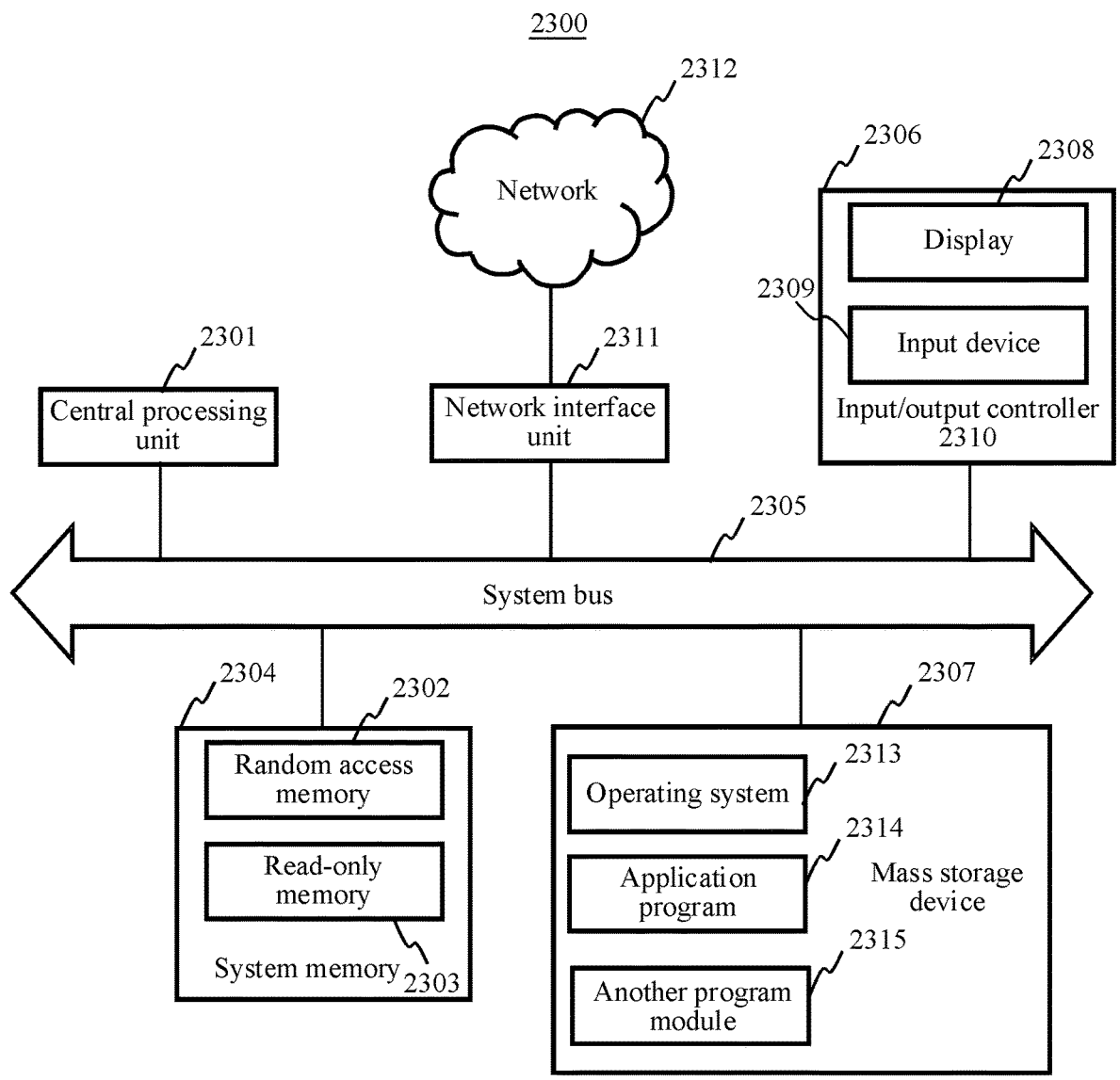
FIG. 23 is a block diagram of a computer device according to an exemplary embodiment of the disclosure.

FIG. 23 is a schematic structural diagram of a computer device according to an exemplary embodiment of the disclosure. The computer device may be the server 130 in the embodiment in FIG. 1. Specifically, the computer device 2300 includes a central processing unit (CPU) 2301, a system memory 2304 including a random access memory (RAM) 2302 and a read-only memory (ROM) 2303, and a system bus 2305 connecting the system memory 2304 and the CPU 2301. The computer device 2300 further includes a basic input/output (I/O) system 2306 assisting in transmitting information between components in a computer, and a mass storage device 2307 configured to store an operating system 2313, an application program 2312, and another program module 2315.

The basic I/O system 2306 includes a display (e.g., monitor) 2308 configured to display information and an input device 2309 such as a mouse or a keyboard that is configured for information inputting by a user. The display 2308 and the input device 2309 are both connected to the CPU 2301 by using an input/output controller 2310 connected to the system bus 2305. The basic I/O system 2306 may further include the I/O controller 2310, to receive and process inputs from a plurality of other devices, such as the keyboard, the mouse, or an electronic stylus. Similarly, the I/O controller 2310 further provides an output to a display screen, a printer, or another type of output device.

The mass storage device 2307 is connected to the CPU 2301 by using a large-capacity storage controller (not shown) connected to the system bus 2305. The mass storage device 2307 and an associated computer-readable storage medium thereof provide non-volatile storage for the computer device 2300. That is, the mass storage device 2307 may include a computer-readable storage medium (not shown), such as a hard disk or a CD-ROM drive.

Without loss of generality, the computer-readable storage medium may include a computer storage medium and a communication medium. The computer storage medium includes volatile and non-volatile media, and removable and non-removable media implemented by using any method or technology used for storing information such as computer-readable instructions, data structures, program modules, or other data. The computer-storage medium includes a RAM, a ROM, an erasable programmable ROM (EPROM), an electrically erasable programmable ROM (EEPROM), a flash memory or another solid-state storage technology, a CD-ROM, a DVD or another optical storage, a magnetic cassette, a magnetic tape, or a magnetic disk storage or another magnetic storage device. Certainly, a person skilled in the art may learn that the computer storage medium is not limited to the foregoing several types. The system memory 2304 and the mass storage device 2307 may be collectively referred to as a memory.

The memory stores one or more programs. The one or more programs are configured to be executed by one or more CPUs 2301, and include instructions for implementing the foregoing method for scheduling virtual objects in a virtual environment. The CPU 2301 executes the one or more programs to implement the user interface display method provided in the foregoing method embodiments.

According to the various embodiments of the disclosure, the computer device 2300 may further be connected, through a network such as the Internet, to a remote computer on the network for running That is, the computer device 2300 may be connected to a network 2312 by using a network interface unit 2311 connected to the system bus 2305, or may be connected to another type of network or a remote computer system (not shown) by using a network interface unit 2311.

The memory further includes one or more programs. The one or more programs are stored in the memory. The one or more programs include operations to be executed by the server, in the user interface display method or the method for picking up a virtual resource provided in the embodiments of the disclosure.

An embodiment of the disclosure further provides a computer-readable storage medium, the storage medium storing at least one instruction, at least one program, a code set, or an instruction set, the at least one instruction, the at least one program, the code set or the instruction set being loaded and executed by a processor to implement the user interface display method or the method for picking up a virtual resource according to any one of the foregoing embodiments.

The disclosure further provides a computer program product, and the computer program product, when run on a computer, causes the computer to perform the user interface display method or the method for picking up a virtual resource according to the foregoing method embodiments.

It is to be understood that "plurality of" mentioned in the specification means two or more. "And/or" describes an association relationship for associated objects and represents that three relationships may exist. For example, A and/or B may represent the following three cases: only A exists, both A and B exist, and only B exists. The character "/" in this specification generally indicates an "or" relationship between the associated objects.

The sequence numbers of the foregoing embodiments of the disclosure are merely for description purpose but do not imply the preference among the embodiments.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

A person of ordinary skill in the art would understand that all or some of the operations of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely exemplary embodiments of the disclosure, but are not intended to limit the disclosure. Any modification, equivalent replacement, or improvement and the like made within the spirit and principle of the disclosure fall within the protection scope of the disclosure.

What is claimed is:

1. A user interface display method, performed by at least one processor of a terminal, the method comprising:
    displaying a user interface of an application program running on the terminal, the user interface displaying an image of a virtual environment around a target virtual object, the target virtual object being a virtual object in the virtual environment that is controlled by using the terminal, the virtual environment being observed from a perspective;
    receiving a display instruction from a server, the display instruction comprising data of a first-class object and data of a second-class object, the first-class object being a virtual object having obtained a larger quantity of virtual resources than the target virtual object, the second-class object being a virtual object having obtained an equal or smaller quantity of virtual resources than the target virtual object;
    displaying first visible information in the user interface according to the data of the first-class object, and displaying, based on the second-class object being within a field of view from the perspective, second visible information in the user interface according to the data of the second-class object,
    wherein the displaying the first visible information comprises:
    displaying the first visible information with respect to the first-class object that is not within the field of view from the perspective due to an opaque object in the virtual environment that blocks a view of the first-class object.

2. The method according to claim 1, wherein the view of the first-class object is blocked by the opaque object that is located in front of the first-class object in a direction of the perspective.

3. The method according to claim 1, wherein the displaying the first visible information through the opaque object comprises:
    displaying body model information of the first-class object in the virtual environment through the opaque object.

4. The method according to claim 1, wherein the displaying the first visible information with respect to the first-class object that is not within the field of view comprises:
    displaying first state information of the first-class object through the first opaque object,
    the first state information comprising at least one of a health point or an endurance value of the first-class object, a quantity of virtual resources of the first-class object, a defense value of the first-class object, or prop information of the first-class object.

5. The method according to claim 3, wherein the body model information of the first-class object comprises at least one of a contour of the first-class object or a posture of the first-class object.

6. The method according to claim 3, wherein the displaying body model information of the first-class object in the virtual environment through the opaque object comprises:
    generating, according to the data of the first-class object by using a silhouette effect, the body model information overlaid on the opaque object, the body model information being body model information of the first-class object in the virtual environment; and
    displaying the opaque object and the body model information overlaid on the opaque object.

7. The method according to claim 1, wherein the user interface further displays a map of the virtual environment; and
    the displaying first visible information in the user interface comprises:
    displaying an identifier of the first-class object in a first region on the map, the first region being corresponding to a position of the first-class object in the virtual environment.

8. The method according to claim 1, wherein the displaying the first visible information in the user interface comprises:
    displaying an information window in the user interface, the first visible information being displayed in the information window; and
    the first visible information comprises at least one of a position of the first-class object and first state information of the first-class object,
    the first state information comprising at least one of a health point or an endurance value of the first-class object, a quantity of virtual resources of the first-class object, a defense value of the first-class object, or prop information of the first-class object.

9. The method according to claim 1, further comprising, prior to receiving the display instruction:
    receiving a first generation instruction from the server;
    obtaining, according to a start position of each virtual resource and a start speed of the each virtual resource included in the first generation instruction, a motion trajectory of each virtual resource; and
    displaying the motion trajectory of each virtual resource in the user interface.

10. The method according to claim 9, further comprising:
    obtaining a final position of each virtual resource according to the start position and the motion trajectory; and
    displaying each virtual resource at the final position.

11. The method according to claim 1, further comprising, prior to receiving the display instruction:
    transmitting target state information of the target virtual object to the server, the target state information being used for indicating a position of the target virtual object in the virtual environment;
    receiving a pick-up instruction from the server, based on the target virtual object meeting a pick-up condition for picking up a target virtual resource;
    controlling, according to the pick-up instruction, the target virtual object to pick up the target virtual resource; and
    updating a quantity of virtual resources of the target virtual object according to the target virtual resource being picked up by the target virtual object.

12. The method according to claim 1, further comprising:
receiving, from the server, a winner display instruction to display a winner in the application program based on a virtual object having a largest quantity of virtual resources; and
displaying information of the winner in the user interface according to the winner display instruction.

13. The method according to claim 12, further comprising, prior to receiving the winner display instruction:
receiving a revival position from the server based on a hit point or an endurance value of the target virtual object being zero, the revival position being a position meeting a revival condition in the virtual environment; and
reviving the target virtual object at the revival position.

14. The method according to claim 13, wherein the revival condition comprises conditions that:
no other virtual objects exist within a first range with the revival position as a center and a first distance from the revival position as a radius; and
another virtual object exists within a second range with the revival position as a center and a second distance from the revival position as a radius, the first distance being shorter than the second distance.

15. The method according to claim 13, further comprising:
receiving an update instruction from the server, based on the hit point or the endurance value of the target virtual object being zero, the update instruction including an updated quantity of virtual resources; and
updating the quantity of virtual resources of the target virtual object according to the updated quantity of virtual resources included in the update instruction, the updated quantity being a quantity of virtual resources of the target virtual object that is reduced at a preset ratio.

16. The method according to claim 13, further comprising:
receiving a second generation instruction from the server, the second generation instruction including a disappearance position at which the hit point or the endurance value of the target virtual object drops to zero; and
generating a virtual resource at the disappearance position according to the second generation instruction.

17. A user interface display apparatus, comprising:
at least one memory configured to store program code; and
at least one processor configured to read the program code and operate as instructed by the program code, the program code comprising:
display code configured to cause at least one of the at least one processor to display a user interface of an application program running on a terminal, the user interface displaying an image of a virtual environment observed from a perspective corresponding to a target virtual object, the target virtual object being a virtual object in the virtual environment that is controlled by using the terminal; and
receiving code configured to cause at least one of the at least one processor to receive a display instruction from a server, the display instruction comprising data of a first-class object and data of a second-class object, the first-class object being a virtual object having obtained a larger quantity of virtual resources than the target virtual object, the second-class object being a virtual object having obtained an equal or smaller quantity of virtual resources than the target virtual object,
the display code being further configured to cause at least one of the at least one processor to: display first visible information according to the data of the first-class object in the user interface, and display, based on the second-class object being within a field of view from the perspective, second visible information in the user interface according to the data of the second-class object,
wherein the display code is further configured to cause at least one of the at least one processor to display the first visible information with respect to the first-class object that is not within the field of view from the perspective due to an opaque object in the virtual environment that blocks a view of the first-class object.

18. A user interface display apparatus, comprising:
at least one memory configured to store program code; and
at least one processor configured to read the program code and operate as instructed by the program code, the program code comprising:
processing code configured to cause at least one of the at least one processor to: obtain quantities of virtual resources of n virtual objects in a virtual environment, n being a positive integer, and n≥3; and determine a first-class object and a second-class object of a target virtual object among the n virtual objects according to a quantity of virtual resources included in each virtual object, the first-class object being a virtual object of which a quantity of virtual resources is greater than that of the target virtual object, the second-class object being a virtual object of which a quantity of virtual resources is equal to or less than that of the target virtual object; and
transmission code configured to cause at least one of the at least one processor to transmit a display instruction to a terminal corresponding to the target virtual object, the display instruction being used for instructing the terminal to: display first visible information according to data of the first-class object, included in the display instruction, in a user interface; and display, based on the second-class object being within a field of view from a perspective of the target virtual object, second visible information according to data of the second-class object, included in the display instruction, in the user interface,
wherein the display instruction is used for instructing the terminal to display the first visible information with respect to the first-class object that is not within the field of view from the perspective due to an opaque object in the virtual environment that blocks a view of the first-class object.

19. A terminal, comprising a processor and a memory, the memory storing at least one instruction, the at least one instruction being loaded and executed by the processor to implement the method according to claim 1.

20. A non-transitory computer-readable storage medium, storing at least one instruction, the at least one instruction being loaded and executed by a processor to implement the method according to claim 1.

* * * * *